(12) United States Patent
Morimoto et al.

(10) Patent No.: US 9,109,275 B2
(45) Date of Patent: Aug. 18, 2015

(54) HIGH-STRENGTH GALVANIZED STEEL SHEET AND METHOD OF MANUFACTURING THE SAME

(75) Inventors: Yasuhide Morimoto, Tokyo (JP); Nobuhiro Fujita, Tokyo (JP); Akihiro Miyasaka, Tokyo (JP); Kazuhiko Honda, Tokyo (JP); Masafumi Azuma, Tokyo (JP); Noriyuki Suzuki, Tokyo (JP); Toshiki Nonaka, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 136 days.

(21) Appl. No.: 13/392,455

(22) PCT Filed: Aug. 31, 2010

(86) PCT No.: PCT/JP2010/064839
§ 371 (c)(1),
(2), (4) Date: Feb. 24, 2012

(87) PCT Pub. No.: WO2011/025042
PCT Pub. Date: Mar. 3, 2011

(65) Prior Publication Data
US 2012/0152411 A1 Jun. 21, 2012

(30) Foreign Application Priority Data

Aug. 31, 2009 (JP) .............................. P2009-200467
Sep. 18, 2009 (JP) .............................. P2009-216986
Sep. 18, 2009 (JP) .............................. P2009-217578

(51) Int. Cl.
*C23C 2/28* (2006.01)
*C23C 2/06* (2006.01)
(Continued)

(52) U.S. Cl.
CPC ................ *C23C 2/06* (2013.01); *B22D 11/115* (2013.01); *B32B 15/013* (2013.01); *C21D 1/74* (2013.01);
(Continued)

(58) Field of Classification Search
USPC .................... 148/400, 533; 164/498; 428/659
See application file for complete search history.

(56) References Cited

U.S. PATENT DOCUMENTS

| | | | |
|---|---|---|---|
| 5,112,416 A | 5/1992 | Tanaka et al. | |
| 2002/0160221 A1 | 10/2002 | Takeda et al. | |

(Continued)

FOREIGN PATENT DOCUMENTS

| | | |
|---|---|---|
| DE | 10 2007 061 489 A1 | 6/2009 |
| JP | 59-219473 A | 12/1984 |

(Continued)

OTHER PUBLICATIONS

International Search Report for International Application No. PCT/JP2010/064839 dated Dec. 7, 2010 with English translation.

(Continued)

*Primary Examiner* — Kaj K Olsen
*Assistant Examiner* — Alexander Polyansky
(74) *Attorney, Agent, or Firm* — Birch, Stewart, Kolasch & Birch, LLP

(57) ABSTRACT

Provided is a galvanized steel sheet having a tensile strength of 770 MPa or more including a steel sheet portion, and a plated layer formed on the surface of the steel sheet portion, in which the plated layer is a galvanized plated layer or an galvannealed plated layer, the steel sheet portion has a soft layer that directly adjoins the interface with the plated layer and an inside layer that is other than the soft layer, the thickness D of soft layer is 0.001% to 5% of thickness t of the steel sheet portion, and, when the hardness of the soft layer measured by nano-indentation method is indicated by H1, and the representative hardness of the steel sheet portion measured by the nano-indentation method is indicated by Ha in cross section that goes along the thickness direction of the steel sheet portion, H1 is 5% to 75% of Ha.

6 Claims, 1 Drawing Sheet

(51) Int. Cl.
*B22D 11/115* (2006.01)
*C21D 1/74* (2006.01)
*C21D 1/76* (2006.01)
*C21D 9/46* (2006.01)
*C22C 18/04* (2006.01)
*C22C 38/00* (2006.01)
*C22C 38/02* (2006.01)
*C22C 38/04* (2006.01)
*C22C 38/06* (2006.01)
*C23C 2/26* (2006.01)
*B32B 15/01* (2006.01)
*C22C 38/12* (2006.01)
*C22C 38/14* (2006.01)
*C22C 7/00* (2006.01)
*B22D 27/02* (2006.01)
*B32B 15/00* (2006.01)

(52) U.S. Cl.
CPC .. *C21D 1/76* (2013.01); *C21D 9/46* (2013.01); *C22C 18/04* (2013.01); *C22C 38/001* (2013.01); *C22C 38/02* (2013.01); *C22C 38/04* (2013.01); *C22C 38/06* (2013.01); *C22C 38/12* (2013.01); *C22C 38/14* (2013.01); *C23C 2/26* (2013.01); *C21D 2211/004* (2013.01); *Y10T 428/12799* (2015.01)

(56) References Cited

U.S. PATENT DOCUMENTS

| | | |
|---|---|---|
| 2006/0269776 A1 | 11/2006 | Tanaka et al. |
| 2006/0292391 A1 | 12/2006 | Ikematsu et al. |
| 2007/0051438 A1 | 3/2007 | Honda et al. |
| 2011/0076477 A1 | 3/2011 | Brandstatter et al. |
| 2012/0152411 A1 | 6/2012 | Morimoto et al. |

FOREIGN PATENT DOCUMENTS

| | | | |
|---|---|---|---|
| JP | 2-175839 A | 7/1990 | |
| JP | 3-28359 A | 2/1991 | |
| JP | 3-64437 A | 3/1991 | |
| JP | 3-168411 A | 7/1991 | |
| JP | 4-276057 A | 10/1992 | |
| JP | 5-70886 A | 3/1993 | |
| JP | 5-186882 A | 7/1993 | |
| JP | 5-195143 A | 8/1993 | |
| JP | 8-291379 A | 11/1996 | |
| JP | 10-88305 A | 4/1998 | |
| JP | 2000-290730 A | 10/2000 | |
| JP | 2001-234290 A | 8/2001 | |
| JP | 2002-88459 A | 3/2002 | |
| JP | 2003-73772 A | 3/2003 | |
| JP | 2003-105516 A | 4/2003 | |
| JP | 2003-171752 A | 6/2003 | |
| JP | 2004-263295 A | 9/2004 | |
| JP | 2005-194586 A | 7/2005 | |
| JP | 2006-9057 A | 1/2006 | |
| JP | 2006-57120 A | 3/2006 | |
| JP | 2007-100200 A | 4/2007 | |
| JP | 2007-262553 A | 10/2007 | |
| JP | 2008-24561 A | 2/2008 | |
| JP | 2008-202115 A | 9/2008 | |
| JP | 2008-255441 A | 10/2008 | |
| JP | 2008-255442 A | 10/2008 | |
| JP | 2008255442 A * | 10/2008 | ............ C22C 38/00 |
| JP | 4943558 B2 | 5/2012 | |
| RU | 2312162 C2 | 12/2007 | |
| RU | 2312920 C2 | 12/2007 | |
| RU | 2323266 C2 | 4/2008 | |
| WO | 2009/004424 A1 | 1/2009 | |

OTHER PUBLICATIONS

Japanese Office Action for Japanese Application No. 2011-502183 dated Apr. 26, 2011 with English translation.

Japanese Office Action for Japanese Application No. 2011-502183 dated Sep. 27, 2011 with English translation.

Leslie, "The Physical Metallurgy of Steels," May 31, 1985, 6 pages total including partial English translation.

Toshinori et al., "Effect of the second phase on Fatigue limit of hot-rolling high-tensile steel plate," The preprint of the 40th academic conference by The Japan Institute of Metals, 1991, pp. 16-18, 4 pages of partial English translation.

Russian Decision on Grant for corresponding Russian Application No. 2012107854/02 dated Sep. 4, 2013 (with English translation).

Mexican Office Action dated Dec. 17, 2014, issued in Mexican Patent Application MX/a/2012/002450.

Chinese Office Action dated Dec. 5, 2013 issued in Chinese Patent Application No. 201080037650.3.

Supplementary Partial European Search Report Dated Jun. 1, 2015, issued in European Patent Application No. 10812088.2.

* cited by examiner

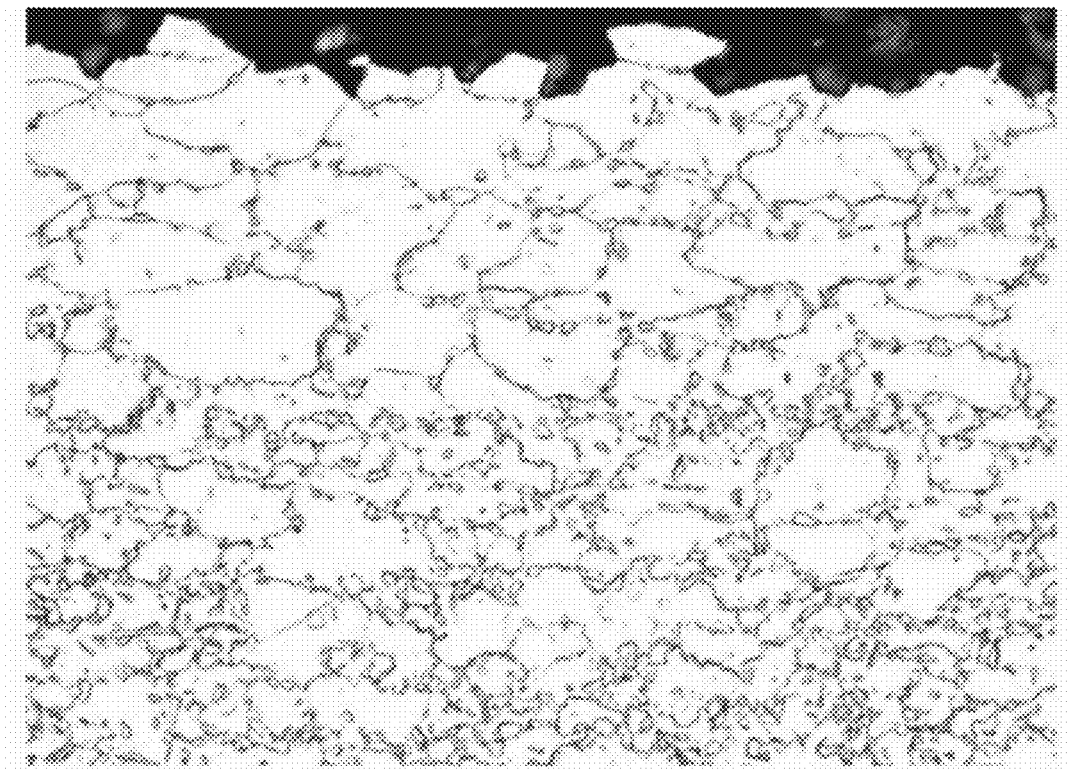

HIGH-STRENGTH GALVANIZED STEEL SHEET AND METHOD OF MANUFACTURING THE SAME

TECHNICAL FIELD

The present invention relates to a high-strength galvannealed steel sheet and a method of manufacturing the same.

Priority is claimed on Japanese Patent Application No. 2009-200467, filed Aug. 31, 2009, Japanese Patent Application No. 2009-217578, filed Sep. 18, 2009, and Japanese Patent Application No. 2009-216986, filed Sep. 18, 2009, the content of which are incorporated herein by reference.

BACKGROUND ART

A typical example of a plated steel sheet having favorable corrosion resistance is a galvannealed steel sheet. The galvannealed steel sheet is generally manufactured by degreasing a steel sheet, preheating the steel sheet in a non-oxidizing furnace or direct fired furnace, carrying out reduction annealing in a reduction furnace for cleaning the surface and securing the material quality, immersing the steel sheet in a galvanizing bath, controlling the adhered amount of molten zinc, and carrying out alloying. Since the steel sheet has excellent corrosion resistance, plate adhesiveness, and the like, the steel sheet is widely used mainly for automobiles, construction materials, and the like.

Particularly, in recent years, in order to both secure a function for protecting passengers in case of collision and reduce the weight for improving the gas mileage in the automobile field, there has been a demand for an increase in the strength of a plated steel sheet. However, generally, an increase in the strength results in degradation of the formability, and thus there has been a demand to establish a method for increasing the strength while the formability is maintained.

Examples of the method for increasing the strength while the formability is maintained include methods as described in Patent Documents 1 and 2. These methods are for increasing the strength and obtaining favorable formability at the same time by dispersing residual austenite in steel and using the fact that the residual austenite causes a stress induction and deformation induction during a process. In the steel sheet as described in Patent Documents 1 and 2, C, Si, and Mn are used as basic alloy elements, annealing is carried out in a two-phase region of ferrite ($\alpha$)+austenite ($\gamma$), and then a thermal treatment is carried out in a temperature region of approximately 300° C. to 450° C., thereby using a bainite transformation and obtaining residual austenite even at room temperature. However, since carbides, such as cementite, tend to be precipitated during the thermal treatment of 300° C. to 450° C., and austenite is decomposed, it is necessary to add Si or Al.

However, since Si and Al are more liable to be oxidized than Fe, it is likely that oxides containing Si or Al are formed on the surface in the above steel sheet. These oxides have poor wetting properties with molten Zn, and thus, in steel sheets containing Si or Al, there is a problem in that non-plated portions are liable to be formed. In addition, the above oxides delay the alloying reaction between Zn and Fe. Therefore, in steel sheets containing Si or Al, long alloying treatment with a high-temperature is required compared with mild steel sheets, degradation of the productivity is caused, austenite is decomposed into a bainite structure including pearlite and carbides by long alloying treatment with the high-temperature, and an excellent formability cannot be obtained.

Patent Document 3 describes a method for solving the above problems. This method is for improving the wetting properties of steel sheets and molten Zn and accelerating the alloying reaction by adding an appropriate concentration of Al to molten Zn.

This method makes it possible to suppress propagation of fatigue cracking that propagates through soft ferrite by structural strengthening that strengthens soft ferrite using a hard structure, such as hard martensite or residual austenite, and thus this method contributes to improving the fatigue durability up to a certain fraction of hard phases. However, since fatigue cracking propagates through soft structures, there is a limit to increasing the fatigue limit simply with an increase in the fraction of hard structures. As a result, when the fraction of hard structures reaches a certain extent or more, the strength of the steel sheet is increased, but the fatigue limit is not increased. Therefore, it was difficult to achieve both an increase in the strength and fatigue durability to a high level (for example, refer to Non Patent Document 1).

Meanwhile, since steel sheets used for automobiles or construction materials have a thin sheet thickness, there are cases in which, when fatigue cracking is formed, the sheet thickness is immediately penetrated and fractured. Due to this fact, suppression of the formation of fatigue cracking is particularly important.

Ordinary techniques for improving the fatigue durability include a method of using precipitation strengthening (for example, refer to Patent Document 4). However, in order to use precipitation strengthening, it is necessary to heat the steel sheet to a high temperature sufficient to melt precipitates (for example, carbonitrides of Nb or Ti) and then cool the steel sheet, and therefore this technique can be applied to hot-rolled steel sheets, but it is difficult to apply the technique to cold-rolled steel sheets.

In addition, Patent Document 5 describes a technique that isolates and disperses a soft phase (ferrite) in a hard second phase, and controls the thickness of the hard phase to be greater than the value specified by the grain diameter of the soft phase, thereby improving the fatigue durability. However, this technique is for suppressing the propagation of cracking formed on the surface of the steel sheet, and is not for suppressing the formation of cracking on the surface, and therefore it is difficult to sufficiently improve the fatigue durability of the steel sheet using this technique.

In addition, Patent Document 6 describes a technique that controls the depths of grain boundary oxides in the interface between a plated layer and a steel sheet to 0.5 µM or less, thereby improving the fatigue durability. The reason why the fatigue durability is improved is considered to be because the decrease in the depths of the grain boundary oxides suppresses stress concentration in the interface between the plated layer and the steel sheet. However, even with this technique, it was difficult to sufficiently suppress the formation of cracking on the surface.

In addition, addition of Si to steel is carried out as an inexpensive method of strengthening a high-strength steel sheet. However, when the amount of Si in the steel exceeds 0.3% by mass %, there was a problem in that the wetting properties are significantly degraded in the Sendzimir method in which a plating bath containing ordinary Al is used, parts of the surface are not plated, and therefore the appearance quality is deteriorated. It is reported that the above phenomenon is because Si oxides are concentrated on the surface of the steel sheet during the reduction annealing, and the wetting properties of the Si oxides with respect to molten Zn are deteriorated.

As measures for solving the above problem, Patent Document 7 describes a method in which heating is carried out in an atmosphere having an air ratio of 0.9 to 1.2 so as to generate Fe oxides, the thicknesses of the oxides are controlled to 500 Å or less in a reduction zone in an atmosphere including $H_2$, and then plating is carried out in a bath to which Mn and Al are added. However, in actual production lines, various kinds of steel sheets including a variety of added elements are threaded, which makes it very difficult to control the thicknesses of the oxides. In addition, Patent Documents 8, 9, and the like describe methods in which specific plating is carried out so as to improve the plating properties as other measures for suppression, but these methods require installation of a new plating facility to the galvanizing line ahead of the annealing furnace, or require a plating treatment that is carried out in advance in an electrical plating line, which significantly increases costs.

Steel sheets having a tensile strength of, ordinarily, 780 MPa or more and, recently, 980 MPa or more are used as high-strength steel sheets for the reinforcing members of automobiles. The high-strength steel sheet is formed generally by a process that is mainly intended for bending. It is known that a high-strength steel sheet having a high C concentration increases the hardness of the steel sheet itself, and the average hardness of the surface layer of the steel sheet, which is measured by the nano-indentation method, exceeds 3.5 GPa.

Here, the nano-indentation method refers to one of methods for evaluating the mechanical properties of thin films. In this method, a small needle is pressed to the measurement target of a thin film under a certain load, the ingression depth of the needle is measured with nanometer (nm) accuracy, and the property values, such as hardness or elasticity, of the thin film are computed.

A problem in a case in which a high-strength steel sheet having a high C concentration is used is hydrogen embrittlement. The hydrogen embrittlement is breaking that is caused by atomic hydrogen which has intruded in the grain boundary and the like under a tensile stress, such as a residual stress. The hydrogen embrittlement can be suppressed by a method in which the concentration of hydrogen in steel is decreased by carrying out a dehydrogenating treatment after the steel sheet is processed into a member, but the number of the manufacturing steps is increased, and the costs are increased.

In addition, when the surface layer of a high-strength steel sheet is hard, cracking is liable to occur in the surface layer of the steel sheet during the bending process, cracking develops during use, and the steel sheet is broken in the sheet thickness direction. This degradation of bending properties causes a significant problem. Patent Document 4 describes a method in which an isothermal treatment is carried out during the annealing step for improving the bending properties, but 3 minutes or more of the isothermal treatment is essential, and this method carried out using a continuous plating facility causes a significant degradation of productivity.

In Patent Documents 11 and 12, the structure or C concentration in the ferrite portion is controlled in order to improve the plating properties. These documents focus to the surface properties of the ferrite while plating is carried out. However, these documents do not sufficiently disclose the analysis, which is carried out after the plating, of the properties of the ferrite portion that directly adjoins the interface with the plate. In the method of Patent Document 12, it is difficult to measure the concentration of C immediately below the interface, particularly, at a depth of 1 μm or less.

CITATION LIST

Patent Documents

[Patent Document 1] Japanese Unexamined Patent Application, First Publication No. H05-70886
[Patent Document 2] Japanese Unexamined Patent Application, First Publication No. H05-195143
[Patent Document 3] Japanese Unexamined Patent Application, First Publication No. 2003-105516
[Patent Document 4] Japanese Unexamined Patent Application, First Publication No. 2006-57120
[Patent Document 5] Japanese Unexamined Patent Application, First Publication No. 2005-194586
[Patent Document 6] Japanese Unexamined Patent Application, First Publication No. 2003-171752
[Patent Document 7] Japanese Unexamined Patent Application, First Publication No. H04-276057
[Patent Document 8] Japanese Unexamined Patent Application, First Publication No. H03-28359
[Patent Document 9] Japanese Unexamined Patent Application, First Publication No. H03-64437
[Patent Document 10] Japanese Unexamined Patent Application, First Publication No. 2006-9057
[Patent Document 11] Japanese Unexamined Patent Application, First Publication No. 2002-088459
[Patent Document 12] Japanese Unexamined Patent Application, First Publication No. 2003-073772

Non Patent Documents

[Non Patent Document 1] The preprint of the 40$^{th}$ academic conference by The Japan Institute of Metals, written by Yokomaku Toshinori and three other authors, 1991, page 16

DISCLOSURE OF THE INVENTION

Technical Problem

In order to improve the fatigue durability of a steel sheet, it is necessary to suppress formation of cracking on the surface, but it was difficult to stably suppress formation of cracking on the surface in the related art. The present invention has been made in consideration of such a circumstance, and an object of the present invention is to provide a high-strength galvannealed steel sheet that can stably produce favorable fatigue durability.

Solution to Problem

In order to solve the above problem, aspects of the present invention are as follows:

(1) A first aspect of the present invention is a galvanized steel sheet having a tensile strength of 770 MPa or more including a steel sheet portion containing, by mass %, C: 0.05% to 0.50%, Si: 0.005% to 2.5%, Mn: 0.01% to 3.0%, Al: 0% to 0.5%, Ni: 0% to 2.0%, Cu: 0% to 2.0%, Cr: 0% to 2.0%, Mo: 0% to 2.0%, B: 0% to 0.002%, Ti: 0% to 0.1%, Nb: 0% to 0.1%, V: 0% to 0.1%, REM: 0% to 0.1%, and Ca: 0% to 0.1% a remainder of Fe and inevitable impurities, in which P, S, and N are limited to 0.03% or less, 0.02% or less, and 0.0060% or less respectively, and a plated layer formed on the surface of the steel sheet portion, in which the plated layer is a galvanized plated layer or a galvannealed plated layer, the galvanized plated layer containing Al: 0.01% to 1.5% and one or more selected from Pb, Sb, Si, Sn, Mg, Mn, Ni, Cr, Co, Ca, Cu, Li, Ti, Be, Bi, and REM in total of 0% to 3.5% with the remainder of Zn and inevitable impurities, and the galvannealed plated layer containing Fe: 5% to 15%, Al: 0.01% to 1% and one or more selected from Pb, Sb, Si, Sn, Mg, Mn, Ni, Cr, Co, Ca, Cu, Li, Ti, Be, Bi, and REM in a total of 0% to 3.5% with the remainder of Zn and inevitable impurities, the steel sheet portion has a soft layer that directly adjoins the interface with the plated layer and an inside layer that is other than the soft layer, the thickness D of the soft layer is 0.001% to 5% of the thickness t of the steel sheet portion, and, when the hardness of the soft layer measured by the nano-indentation method is indicated by H1, and the representative hardness of the steel sheet portion measured by the nano-indentation method is indicated by Ha in a cross section that goes along the thickness direction of the steel sheet portion, H1 is 5% to 75% of Ha.

(2) In the galvanized steel sheet according to the above (1), when an oxide including one or two of Si and Mn is present in the steel sheet surface layer portion within a depth d or less from the plate/ferrite interface, the depth d in which the oxide is present and D may satisfy $d/4 \leq D \leq 2d$.

(3) In the galvanized steel sheet according to the above (1), the steel sheet portion may further contain more than 0.10% to 0.50% of C.

(4) In the galvanized steel sheet according to the above (1), the C concentration in the soft layer may be 10% to less than 30% of the C concentration of the entire steel sheet portion.

(5) A second aspect of the present invention is a method of manufacturing the galvanized steel sheet according to the above (1), in which the conditions for annealing ahead of plating in a continuous galvanizing line for the steel sheet portion are: the peak sheet temperature is controlled to 650° C. to 900° C.; the annealing atmosphere at the peak sheet temperature is controlled to contain, by volume %, 1% to 10% of hydrogen and the remainder composed of nitrogen and inevitable impurities; and, furthermore, the dew point is controlled to be higher than 0° C. to 50° C.

(6) A third aspect of the present invention is a method of manufacturing the galvanized steel sheet according to the above (1) having a process in which a direct current magnetic field that traverses the thickness of a slab is applied so as to form a direct current electric field zone during continuous casting, and an upper pool that forms the upper area of the slab after the casting and a lower pool that forms the lower area are partitioned, and a process in which a steel material composed of Fe or an alloy mainly containing Fe is supplied to the upper pool.

Advantageous Effects of Invention

The galvanized steel sheet and galvannealed steel sheet according to an aspect of the present invention have excellent fatigue durability and hydrogen embrittlement resistance. In addition, since cracking does not occur in the surface layer of the plated steel sheet even when the steel sheet is subjected to a bending process, the bending properties are excellent.

In addition, according to the method according to an aspect of the present invention, it becomes possible to manufacture a plated steel sheet having excellent fatigue durability, hydrogen embrittlement resistance, and bending properties without degrading productivity.

BRIEF DESCRIPTION OF DRAWINGS

FIG. 1 is a microscopic photograph showing the result of etching the cross section of the typical steel sheet and observing the same using an optical microscope.

DESCRIPTION OF EMBODIMENTS

Any of the above related art does not consider improvement in the fatigue durability of a plated steel sheet. The fatigue durability is a deformation characteristic in a case in which a sufficiently low stress is repeatedly added with respect to the tensile strength, and is an indispensible characteristic for structural members that receive a repetitive stress, such as automobiles, construction machines, and construction materials. When a steel sheet receives a repetitive stress, fine deformation occurs in the steel sheet even when the intensity of the stress is smaller than the yield stress, and accumulation of the deformation results in fracture of the steel sheet. This fracture is caused by cracking that is formed on the surface and propagates into the steel sheet. From this fact, it becomes important to suppress formation of fatigue cracking or suppress propagation of cracking in order to improve the fatigue durability.

Particularly, in a case in which application to automobile members is taken into consideration, there is a concern that even fine cracking may act as a starting point of fracture in case of collision of a vehicle body. In this case, since there is a concern that predetermined collision stability may not be obtained, it is considered to be important to suppress fine cracking in order to improve the collision characteristics. Therefore, it becomes particularly important to suppress formation of cracking on the surface to improve fatigue durability.

In order to suppress formation of cracking, the characteristics of the plated steel sheet, particularly in a portion immediately below the plate interface (a portion that directly adjoins the plate) are important. The steel sheet portion immediately below the interface, particularly in a range of 1 μm or less from the plate interface sometimes has a different hardness from that of the entire steel sheet due to a plurality of causes, such as the increased C concentration compared with the entire steel sheet, accumulation of oxides, and formation of a different composition of the steel structure from the inside of the steel sheet. Therefore, it was found that it is difficult to obtain a stable fatigue durability of a plated steel sheet if the manufacturing method and the quality are not controlled based on an accurate measurement of the hardness of the steel sheet immediately below the plate interface.

In the related art, when investigation on a steel portion below the plate interface was carried out, for example, a method in which the plate is removed using an inhibitor-containing solution, the steel sheet is dissolved up to a depth of approximately 5 μm, and an average carbon concentration and the like of the dissolved steel sheet are measured was used. However, in the measurement results by the present inventors, there were cases in which a stable correlation between the measurement results and the fatigue durability was not obtained particularly in high-strength steel sheets having a tensile strength of 770 MPa or more. As a result of additional investigations, it was found that the characteristics of the steel sheet in a portion of a depth of 1 μm or less from the interface are accurately correlated with the fatigue durability. In a measurement according to the related art, the range of measurement of a portion of a depth of 5 μm or less is too broad, and therefore the characteristic of the steel sheet immediately below the interface cannot be investigated sufficiently, which is considered to be a cause of the poor correlation.

In addition, as a result of repetitive thorough studies regarding improvement in the fatigue durability of a high-strength galvannealed steel sheet, the inventors found that the fatigue durability can be improved without degrading the formability by forming a microstructure, in which the area ratio of ferrite is 95% or more, in the interface between the high-strength steel sheet and the galvannealed plated layer in an average thickness of 0.01 μm to 10 μm. Particularly, as long as the area ratio of ferrite is appropriately controlled immediately below the interface, that is, at a depth of 1 μM or less, the fatigue durability can be stably improved.

In addition, the inventors found that it is possible to reduce only the hardness of a close-to-interface layer, which is the steel sheet surface (the vicinity of the plate interface) portion that does not affect the strength of the steel sheet, by adjusting the steel components and the processing steps. It was found that this method can improve the ductility of the close-to-interface layer, suppress the occurrence of cracking, and further improve hydrogen embrittlement resistance. In addition, it was found that generation of oxides of Si and Mn in the vicinity of the steel sheet surface layer (in the vicinity of the close-to-interface layer) can improve the hydrogen embrittlement resistance since the oxides suppress propagation of cracking even when cracking occurs, and, furthermore, formation of the oxides inside the steel sheet can secure favorable plating properties.

First Embodiment

Hereinafter, a first embodiment of the present invention will be described in detail.

Firstly, the reasons why the components of the steel sheet are limited will be described. Furthermore, % in the present invention refers to mass % unless otherwise specified.

(Steel Sheet Components)

C is an essential element in a case in which increasing the strength of the steel sheet is attempted through structural strengthening which is achieved by martensite or residual austenite. The reason why the amount of C is set to 0.05% or more is that, when the amount of C is less than 0.05%, cementite or pearlite is liable to be generated in a galvanizing line in which it is difficult to quench the steel sheet from the annealing temperature using mist or water jets as a cooling medium, and it is difficult to secure the necessary tensile strength. In order to stably achieve a high strength of 770 MPa or more, the C amount is preferably set to more than 0.08%, and more preferably to more than 0.10%. On the other hand, the reason why the amount of C is set to 0.50% or less is that, when the amount of C exceeds 0.50%, the weldability is significantly degraded. Meanwhile, in a case in which a more preferably weldability is required, the amount of C is set to 0.25% or less, and more preferably to 0.20% or less.

Si is an element that increases the strength without significantly impairing the formability, particularly elongation of the steel sheet, and is added at 0.005% to 2.5%. The reason why the amount of Si is set to 0.005% or more is to secure a sufficient tensile strength. Furthermore, in order to stably obtain a tensile strength of 770 MPa or more, the amount of Si is more preferably set to 0.5% or more, and still more preferably to 1.0% or more. The reason why the upper limit of the amount of the Si is set to 2.5% or less is that, as long as the upper limit is within the above range, the effect of increasing the strength is not saturated, and the ductility is not degraded. Particularly, in order to obtain favorable weldability and plating properties, the upper limit of Si is more preferably set to 2.0%, and still more preferably to 1.5%.

In addition, when Si is added four times or more than the amount of C, the progress of the pearlite and bainite transformation is significantly delayed by reheating for an alloying treatment, which is carried out immediately after the plating, a microstructure in which one or two kinds of 5% to 70% of martensite or residual austenite by the area ratio is included in ferrite even after the steel sheet is cooled to room temperature, and it becomes easy to secure a sufficient strength.

The range of the Mn amount is set to 0.01% to 3.0% by mass %. The lower limit at which the effect of increasing the strength is exhibited was set to 0.01%, and the upper limit was set to 3.0% from the viewpoint of manufacturing costs. Meanwhile, since Mn decreases the free energy of austenite together with C, Mn is more preferably added at 1.5% or more, and still more preferably at 2.0% or more for the purpose of stabilizing austenite until the steel sheet is immersed in a plating bath. In addition, in a case in which Mn is added 12 times or more than the amount of C, the progress of the pearlite and bainite transformation is significantly delayed in reheating for an alloying treatment, which is carried out immediately after the plating, a microstructure in which one or two kinds of 5% to 70% of martensite or residual austenite by the area ratio is included in ferrite even after the steel sheet is cooled to room temperature, and it becomes easy to secure a sufficient strength. However, when the added amount becomes excessive, since cracking is liable to occur in the slab, and the weldability is also deteriorated, the upper limit is more preferably set to 2.8%, and still more preferably to 2.5% in a case in which the strength, formability, and costs are taken into consideration.

Generally, P is included in steel as an inevitable impurity; however, when the amount of P exceeds 0.03%, the spot weldability is significantly deteriorated. In addition, in this case, in a high-strength steel sheet having a tensile strength of more than 770 MPa, such as the embodiment, both the toughness and the cold rolling properties are significantly deteriorated. Therefore, the amount of P is set to 0.03% or less. A smaller amount of P results in a more favorable formability, and the amount of P is more preferably set to 0.02% or less, and still more preferably to 0.01% or less. On the other hand, since reduction of the amount of P to less than 0.001% excessively increases the refinement costs, the lower limit of the amount is set to 0.001%. The amount of P is preferably set to 0.003% to 0.01% in terms of the balance among the strength, the formability, and the costs.

S is also, generally, included in steel as an inevitable impurity, and, when the amount thereof exceeds 0.02%, MnS stretched in the rolling direction is significantly generated, and the bending properties of the steel sheet are adversely affected. Therefore, the amount of S is limited to 0.02% or less. The amount of S is more preferably set to 0.01% or less, and still more preferably to 0.005% or less. However, it costs money to reduce the amount of S. From the viewpoint of the formability and the plate adhesiveness, it is not necessary to excessively reduce the amount of S, and the amount of S may be reduced to a level necessary for the conditions of the hot rolling formability, corrosion resistance, and the like.

N is also, generally, included in steel as an inevitable impurity. When the amount of N exceeds 0.0060%, elongation and brittleness are deteriorated, and therefore the amount of N is limited to 0.0060% or less. Particularly, in a case in which a favorable formability is required, the amount of N is more preferably set to 0.004% or less, and still more preferably to 0.003% or less. A smaller amount of N is preferred, but reducing the amount to less than 0.0005% increases the costs excessively, and therefore the lower limit of the amount is set to 0.0005%.

Addition of Al is not essential; however, in a case in which Al is added, Al is added as a deoxidizing element of steel, and exhibits an effect of the refinement of a hot-rolled material through MN and suppressing the coarsening of crystal grains in a series of thermal treatment processes, thereby improving the material quality. In a case in which this effect is required, Al needs to be added at 0.005% or more, and preferably 0.01% or more. However, when more than 0.5% of Al is added, since the costs are increased, and the surface properties are deteriorated, the amount of Al is set to 0.5% or less, preferably to 0.3% or less, more preferably to 0.1% or less, and still more preferably to 0.05% or less.

In addition, one or more of Ni, Cu, Cr, Mo, B, Ti, Nb, V, REM (for example, La and Ce), and Ca may be added to steel containing the above elements as the main components. Containing these elements does not impair the effects of the embodiment, and, also, there are preferable cases in which the strength or formability is improved depending on the amounts thereof. Specifically, the amounts are as follows: Ni: 0.05% to 2.0%, Cu: 0.05% to 2.0%, Cr: 0.05% to 2.0%, Mo: 0.05% to 2.0%, B: 0.0001% to 0.002%, Ti: 0.001% to 0.1%, Nb: 0.001% to 0.1%, V: 0.001% to 0.1%, REM: 0.0001% to 0.1%, and Ca: 0.0001% to 0.1%.

Addition of Ni, Cu, Cr, and Mo is not essential; however, in a case in which Ni, Cu, Cr, and Mo are added, similarly to Si, there is a tendency of delaying the generation of carbides, and remaining of austenite is helped. In addition, these alloy elements lower the martensite transformation start temperature of austenite. Therefore, addition of Ni, Cu, Cr, and Mo is effective for increasing the formability or fatigue strength. However, in a case in which the added amount of each of the alloy elements is less than 0.05%, the above effects are not sufficient, and therefore it is desirable to set 0.05% as the lower limit values of the added amounts of these elements. On the other hand, when the added amount is increased, since the effect of increasing the strength is saturated, and the deterioration rate of the ductility is increased, it is desirable to set 2% as the upper limit value of the added amount of each of these elements.

In addition, when the total added amount of elements Ni, Cu, Cr, and Mo exceeds 3.5%, since the hardenability of a steel material is increased more than necessary, it becomes difficult to manufacture a steel sheet that mainly includes ferrite and has a favorable formability, and an increase in the costs for the steel material is caused. Therefore, the upper limit value of the total added amount of the above alloy elements is preferably set to 3.5%.

Addition of B is not essential, but B is known as an element that increases the hardenability when added, and it is desirable to add 0.0001% or more of B in order to delay the pearlite and bainite transformation when reheating is carried out for an alloying treatment. However, when the added amount exceeds 0.005%, since a sufficient area ratio of ferrite is not grown during cooling from the two-phase coexisting temperature region of ferrite and austenite, and it becomes difficult to manufacture a steel sheet that mainly includes ferrite and has a favorable formability, it is desirable to set 0.005% as the upper limit value, and it is more desirable to set 0.002% as the upper limit value.

Addition of Ti, Nb, and V is not essential, but these elements are effective for increasing the strength of a steel sheet since the elements form carbides and nitrides (or carbonitrides), and strengthen the ferrite phase. However, in a case in which the added amount of each of these alloy elements is less than 0.001%, the above effects are not sufficient, and therefore, it is desirable to set 0.001% as the lower limit values of the added amounts of these elements. On the other hand, in a case in which more than 0.1% is added, since an increase in the costs for a steel material is caused, the effect of increasing the strength is saturated, and, furthermore, C is unnecessarily wasted, it is desirable to set 0.1% as the upper limit value of the added amount of each of the elements.

In addition, similarly, in a case in which Ti, Nb, and V are added in a total of more than 0.20%, since an increase in the costs for a steel material is caused, the effect of increasing the strength is saturated, and, furthermore, C is unnecessarily wasted, it is desirable to set the upper limit value of the total added amount of these alloy elements to 0.2%.

Addition of REM and Ca is not essential, but REM and Ca combine with S so as to spheroidize inclusions, and improve the cold workability or fatigue durability. However, in a case in which the added amount of each of them is less than 0.0001%, the effects are not sufficient. Therefore, 0.0001% is set as the lower limit of the added amount. In addition, when these elements are excessively added, since the effects are saturated, and defects in welded portions are increased, the upper limit value of the added amount of each is set to 0.1%.

Next, the galvannealed plated layer will be described. In the embodiment, the galvannealed plated layer refers to a plated layer that mainly includes a Fe—Zn alloy generated by dispersion of Fe in steel during Zn plating, which is caused by the alloying reaction. The amount of Fe is set to 1% to 30%. When an amount of Fe in the plate of less than 7 mass %, there are cases in which a soft Zn—Fe alloy is formed on the plated surface, and the press formability is deteriorated, and, when the amount of Fe exceeds 15 mass %, there are cases in which a brittle alloy layer is developed excessively in the ferrite interface, and the plate adhesiveness is deteriorated. Therefore, the amount of Fe is more preferably 7 mass % to 15 mass %.

In addition, when galvanizing is carried out, since Al is added to a plating bath in order to suppress the alloying reaction in the plating bath, 0.01% to 1.5 mass % of Al is included in the plate. This is because, when the added amount of Al is less than 0.01%, Zn oxide-dominant dross is significantly generated on surface of the plating bath, and the appearance after plating is degraded. Since the effect of suppressing the generation of dross is saturated at the added amount of more than 1.5%, the upper limit was set to 1.5% from the viewpoint of manufacturing costs. The added amount of Al is more preferably 0.05% to 0.50%, and still more preferably 0.10% to 0.30%. In addition, since diffusion of Fe and diffusion of elements added to steel occur at the same time in the process of alloying, these elements are also included in the plate.

The adhered amount of the plate is not particularly limited, but a single surface thickness is preferably 1 μm or more, and more preferably 3 μm or more from the viewpoint of corrosion resistance. In addition, the single surface adhered amount is preferably 20 μm or less from the viewpoint of formability, weldability, and economic efficiency.

Meanwhile, it is still within the scope of the embodiment to plate a top layer or carry out a variety of chemical conversion treatments, for example, a phosphate treatment, a weldability-improving treatment, a lubricity-improving treatment, or the like on the plated steel sheet of the embodiment in order to improve the painting properties and weldability.

The steel sheet of the embodiment does not impair the effects of the embodiment even when the total of 3.5% or less of one or more of Pb, Sb, Si, Sn, Mg, Mn, Ni, Cr, Co, Ca, Cu, Li, Ti, Be, Bi, and rare earth elements are contained or mixed in the galvanizing bath or the zinc plate, and, sometimes, preferably, the corrosion resistance or formability is improved depending on the amount thereof. The adhered amount of the alloyed molten zinc plate is not particularly limited, but is 20 g/m² or more from the viewpoint of the corrosion resistance, and preferably 150 g/m² or less from the viewpoint of economic efficiency.

In addition, since the steel sheet of the embodiment satisfies both a high strength and favorable formability, the single-phase ferrite structure has the maximum area ratio in a complex structure of the microstructure in the steel sheet. The remaining portions of the complex structure are a non-ferrite structure (structures other than the single-phase ferrite) having one or more of bainite, martensite, residual austenite, and the like mixed therein. The area ratio of this non-ferrite structure is set to be from 5% to 70%. The reason why the microstructure in the steel sheet is made into the above complex structure is that it becomes possible to increase the strength while the favorable formability is maintained by strengthening the soft ferrite with the hard non-ferrite structure. When the area ratio of the hard structure is less than 5%, the effect of increasing the strength is not sufficient, and, when the area ratio exceeds 70%, the formability is significantly deteriorated, and therefore the area ratio of one or two of martensite and residual austenite is set to be from 5% to 70%. In a case in which particularly favorable formability is required, it is preferable to set the area ratio of the residual austenite to 5% or more, and effectively use the TRIP (Transformation Induced Plasticity) effect. In a case in which particularly favorable formability is required, the upper limit value of the area ratio of the non-ferrite structure is more preferably 50%, and still more preferably 30%.

Any of a dual phase steel sheet for which martensite is used as the hard structure, a TRIP steel structure for which the stress induction transformation of residual austenite is used, and a complex structure-strengthened steel sheet for which both martensite and residual austenite are used may be used as the complex structure-strengthened steel sheet. In order to obtain favorable formability of the steel sheet, ferrite is controlled to have the maximum area ratio. Since a larger area ratio of ferrite further improves the formability, the area ratio of ferrite is preferably equal to or 60% to less than 95%. In addition, the steel sheet of the embodiment is preferably a high-strength steel sheet in which the tensile strength TS is 490 MPa, and the relationship between the tensile strength TS (MPa) and the elongation EL (%) satisfies TS×EL≥19000. Still more desirable is TS≥590 MPa, and most preferable is TS≥770 MPa and TS×EL≥20000.

In order to obtain more favorable fatigue durability, a microstructure having ferrite at an area ratio of 95% or more may be formed on the steel sheet side of the interface between the steel sheet and the galvannealed plated layer in an average thickness (arithmetic average) of 0.01 μm to 10 μm.

The reason why the fatigue durability is improved by forming the microstructure, in which the area ratio of ferrite is 95% or more, in the interface between the steel sheet and the galvannealed plated layer is considered that this layer acts as a buffer zone. Since the galvannealed plated layer is hard and brittle, there are cases in which cracking that have occurred in the galvannealed plated layer advances into the steel sheet due to load stress, and the steel sheet is finally fractured. On the other hand, when a soft layer (for example, a ferrite layer) is present below the galvannealed plated layer, the cracked ferrite layer is deformed, and stress concentration is prevented, whereby it becomes possible to prevent the cracking from advancing into the steel sheet.

As a result of investigating the relationship between the fatigue durability and microstructure of the galvannealed steel sheet using steels having a variety of components, the inventors found that, when galvannealing is carried out on a complex structure steel sheet that includes ferrite as the major phase and has one or two of martensite and residual austenite at an area ratio of 5% to 30%, more favorable fatigue durability can be obtained by forming a microstructure in which the area ratio of ferrite is 95% or more on the steel sheet side of the interface between the steel sheet and the galvannealed plated layer in an average thickness of 0.01 μm to 10 μm.

In addition, it is particularly important to set the area ratio of ferrite in a range of 1 μm from immediately below the plate interface toward the steel sheet side to 95% or more in order to stably obtain the fatigue durability. When the ferrite layer is 0.05 μm or more separated from the interface with the plated layer, there are cases in which the fatigue durability is adversely affected.

The reason why the average thickness of the microstructure in which the area ratio of ferrite is 95% or more is set to 0.01 μm or more is that, in a case in which the average thickness of the microstructure in which the area ratio of ferrite is 95% or more is less than 0.01 μm, the effect of improving the fatigue durability is not shown. On the other hand, when the average thickness of the microstructure in which the area ratio of ferrite is 95% or more exceeds 10 μm, the effect of improving the fatigue durability begins to degrade. This is considered to be because, when the microstructure having an area ratio of ferrite of 95% or more is thick, slipping that has occurred in the ferrite grain boundaries grows while repetitive stresses are loaded, and acts as the starting point of cracking. In contrast to the above, it is considered that, in a case in which the average of the microstructure in which the area ratio of ferrite is 95% or more is 10 μm or less, since the growth of slipping in graphite grains is significantly suppressed due to the influence of a compressive stress by the galvannealed plated layer having a hard surface, the slipping does not act as the starting point of cracking. That is, it is considered that forming a soft microstructure below the hard galvannealed plated layer in an average of 0.01 μm to 10 μm can suppress the occurrence and advancement of cracking of the two due to the synergistic effect, and favorable fatigue durability can be obtained. More preferably, when the average thickness of the microstructure in which the area ratio of ferrite is 95% or more is set to 3 μm or less, the fatigue durability is more stably improved.

Therefore, a higher area ratio of ferrite increases the effect of improving the fatigue durability, and it is desirable to form a microstructure in which the area ratio of ferrite is 98% or more in an average thickness of 0.01 μm to 10 μm. In addition, since the thickness of the microstructure in which the area ratio of ferrite is not less than 95% or not less than 98% is affected by the thickness of the plated layer, the thickness of the microstructure is preferably twice or less the thickness of the plated layer. The thickness of the microstructure is still more preferably 0.1 μm to 8 μm.

In the embodiment, a method of manufacturing the microstructure in which the area ratio of ferrite is not less than 95% or not less than 98% is not particularly limited as long as the microstructure is formed on the steel sheet side of the interface between the steel sheet and the galvannealed plated layer in an average thickness of 0.01 μm to 10 μm.

In order to more reliably improve the fatigue durability, the area ratio of ferrite in the steel sheet portion immediately below the interface of the plated layer, particularly, in the portion at a depth of 1 μm or less from the interface with the plated layer is more preferably not less than 95% or not less than 98%.

The microstructure in which the area ratio of ferrite is not less than 95% or not less than 98% can be formed on the surface layer at the same time when a thermal treatment is carried out to obtain a complex structure having ferrite as the phase of the maximum area ratio, and one or more of bainite, martensite, and residual austenite mixed therein, as long as a Fe layer having a low carbon concentration is formed on the surface layer of a high-strength steel sheet before annealing.

In addition, the microstructure in which the area ratio of ferrite is not less than 95% or not less than 98% can be easily observed from a cross section. FIG. 1 shows the results of observation of a cross section of a representative steel sheet after etching using an optical microscope. Since the microstructure in which the area ratio of ferrite is not less than 95% or not less than 98% has a characteristic that ferrite grains significantly grow compared with the complex structure that includes ferrite as the major phase and has one or more of bainite, martensite, and residual austenite mixed therein, the microstructure can be easily partitioned using an optical microscope. Furthermore, in a case in which the fraction of the inside structure is obtained, the fraction can be obtained by observing the structure using an SEM or TEM.

A method of manufacturing a multi-layer steel sheet having a Fe layer having a low carbon concentration formed on the surface layer is not particularly limited. It is possible to form a Fe layer having a low carbon concentration on a slab or the steel sheet surface layer by a variety of methods, such as rolling, explosive bonding, decarburization, overlaying, cast boning, and the like. The cheapest method is the addition of Fe only to the surface during continuous casting. That is, firstly, a direct current magnetic field that traverses the thickness of a slab is applied to molten steel fed in a continuous casting mold at a location below the meniscus in the casting direction so as to form a direct current magnetic field zone. Molten steel is supplied to a molten steel pool on the top side and a molten steel pool on the bottom side that are partitioned by the direct current magnetic field through two nozzles having different lengths, and the molten steel is solidified and drawn to carry out continuous casting. In the continuous casting, the concentration of Fe is increased only in the surface layer portion by adding Fe to the molten steel pool on the top side. As a method of adding Fe, a wire-shaped Fe or Fe alloy and the like can be continuously supplied.

The slab of the multi-layer steel sheet cast by the above continuous casting method is processed into a thin sheet by an ordinary hot rolling or cold rolling method, and then plated in a continuous galvanizing line. A method of manufacturing a plated steel sheet is not particularly limited, and an ordinary non-oxidation furnace or all radiant-type galvanizing method can be applied.

Furthermore, the steel sheet of the embodiment sufficiently exhibits the effects with no regard to whether the steel sheet is manufactured into a cold-rolled steel sheet or hot-rolled steel sheet by an ordinary process, and the effects do not significantly vary with the history of the steel sheet. In addition, in the embodiment, the thickness of the steel sheet does not impose any limitation on the embodiment, and the embodiment can be applied as long as the steel sheet has an ordinarily-used sheet thickness. The ordinary sheet thickness is between 0.4 mm to 3.2 mm, but is preferably between 1.0 mm to 3.2 mm in consideration of the load of a rolling machine or productivity.

In addition, the hot rolling conditions, the cold rolling conditions, and the like may be appropriately selected according to the dimensions and necessary strength of the steel sheet, and the effects of the steel sheet of the embodiment are not impaired by the hot rolling conditions, the cold rolling conditions, and the like.

In addition, when annealing is carried out in an in-line annealing type continuous galvanizing line, the annealing conditions are that the steel sheet has a complex structure in which ferrite has the maximum area ratio, and one or more of bainite, martensite, and residual austenite are mixed as the microstructure, and the selected conditions enable the obtainment of a complex structure in which the area ratio of one or two of the martensite and residual austenite is 5% to 70%.

Specifically, annealing is carried out in the two-phase coexisting region of ferrite and austenite of 700° C. to 850° C., and cooling is carried out from the peak temperature to 650° C. at an average rate of 0.5° C./s to 10° C./s, and, subsequently, from 650° C. to the plating bath at an average rate of 1° C./s to 20° C./s. As described above, as long as an Fe layer having a low carbon concentration is formed on the surface layer of the high-strength steel sheet before annealing, at the same time, it becomes possible to form a microstructure in which the area ratio of ferrite is not less than 95% or not less than 98% on the surface layer during the thermal treatment.

As the temperature of the plating bath for galvanizing, the condition in the related art may be applied. For example, the condition of 440° C. to 550° C. can be applied. In addition, in a case in which a galvannealed steel sheet is manufactured by carrying out galvanizing and then a heating alloying treatment, the condition in the related art may be applied as the heating temperature for alloying, for example, the condition of 400° C. to 600° C. can be applied. The heating method for alloying is not particularly limited, a heating method pursuant to a galvanizing line in the related art, such as direct heating using a combustion gas, induction heating, or direct resistance heating, can be used.

After the alloying treatment, the steel sheet is cooled to 200° C. or lower, and subjected to temper rolling according to necessity. The cooling rate after the alloying can be selected depending on the target microstructure, a large cooling rate may be selected in order to promote the martensite transformation, and a small cooling rate may be selected in order to increase the concentration of C in residual austenite by transforming austenite into bainite, and, consequently, produce residual austenite.

The manufactured plated steel sheet was cut in the thickness direction, and the hardness of the steel sheet was measured on a cross section by the nano-indentation method in the vicinity of immediately below the plate/ferrite interface and in the vicinity of a depth of ⅓ of the thickness of the steel sheet. As a measurement apparatus, an atomic force microscope using a diamond indenter having a triangular pyramid shape at the front end (manufactured by Shimadzu Corporation, SPM-9500) was used. A load on the indenter was adjusted so that the indentation depth in the direction toward the inside layer became 5 nm. The hardness of the steel sheet was measured at locations of a depth of 10 nm pitches along the steel sheet thickness direction, five points for each depth were measured, and an average hardness was obtained for each of the depth locations. In the present specification, the hardness of the steel sheet measured by the above method is called the "nano hardness." The nano hardness at a depth of ⅓ of the thickness of the steel sheet is defined as the representative nano hardness (Ha) at the inside of the steel sheet, and hereinafter described as the "nano hardness at the inside of the steel sheet." Using the nano hardness at the inside of the steel sheet as the standard value, a portion immediately below the plate interface in the steel sheet, at which the nano hardness is 75% or less of the standard value, was defined as the softened layer (soft layer or interface soft layer). In summary, the measured values of the nano hardness of the steel sheet at 10 nm pitches in the thickness direction immediately below the plate interface are scanned, and up to a portion at which a measured value that exceeds 75% of the standard value is first detected are considered to be the softened layer.

This depth becomes the depth D (μm) of the softened layer. Meanwhile, in a case in which the average values of the nano hardness measured at five layers from 10 nm to 50 nm depth immediately below the plate interface exceeded 75% of the standard value, it was determined that there was no softened layer, and the above average value was recorded as the hardness of the surface layer.

In a case in which the depth D of the softened layer in the plated steel sheet was 0.001% to 5% of the thickness t of the steel sheet portion, the fatigue durability particularly stably showed a favorable value. In a case in which D did not reach 0.001% oft, the fatigue durability became poor, and, in a case in which D exceeded 5% oft, there were cases in which a problem occurred with the strength of the plated steel sheet.

The concentration of C in the surface layer was measured as follows:

(In a case in which the softened layer D is 0.1 μm to 5 μm)

After only the plated layer is dissolved and removed using an inhibitor-containing 30 mass % HCl aqueous solution, the front and rear surfaces of the ferrite is dissolved by D μm using a 5 mass % HCl aqueous solution at 60° C. based on the weight method in which the reduced amount of thickness is assessed using the weights before and after pickling as indexes. Next, with respect to the dried substance obtained by vaporizing and drying the dissolution fluid, the C amount is determined using the infrared absorption method after combustion of JIS Standard G1211.

(In a case in which the softened layer D exceeds 5 μm)

After only the plated layer is dissolved and removed using an inhibitor-containing 30 mass % HCl aqueous solution, the front and rear surfaces of the ferrite is dissolved by 5 μm using a 5 mass % HCl aqueous solution at 60° C. based on the weight method in which the reduced amount of thickness is assessed using the weights before and after pickling as indexes. Next, with respect to the dried substance obtained by vaporizing and drying the dissolution fluid, the C amount is determined using the infrared absorption method after combustion of JIS Standard G1211.

(In a case in which the softened layer D is less than 0.1 μm)

Weights are determined at an arbitrary 5 points on a cross section of the ferrite surface layer using a FE-EPMA having a probe diameter of 0.1 μm, and the average value thereof is obtained. However, since the probe diameter is larger than the softened layer D, the measured values are used as reference values.

Meanwhile, in order to maintain a sufficient strength of the steel sheet even when the softened layer exists, the concentration of C in the softened layer is preferably 10% to less than 30% with respect to the concentration of C in the entire steel sheet. When the concentration of C in the softened layer becomes 10% or less of the concentration of C in the entire steel sheet, the softened layer becomes softer than necessary, and there are cases in which the strength of the steel sheet is adversely affected.

EXAMPLE 1

Hereinafter, the embodiment will be described specifically using an example.

Continuous casting was carried out in a continuous casting facility provided with an electromagnetic brake and a wire supplying apparatus for adding an alloy at the molding section, thereby obtaining steels having the compositions as shown in Table 1. The electromagnetic force of the electromagnetic brake was set to 0.1 T to 1.0 T, and a Fe wire was used. The added amount of the Fe wire was adjusted using the cross-sectional area and supply rate of the Fe wire.

Next, slabs that were manufactured in the above manner and had an increased concentration of Fe in the surface layer portion were hot-rolled at a heating temperature of 1080° C. to 1150° C., a finishing completion temperature of 910° C. to 930° C., and a winding temperature of 580° C. to 690° C., thereby making a steel sheet having a sheet thickness of 4.0 mm. Furthermore, the slabs were pickled, then cold-rolled so as to be 2.0 mm in thickness, and subjected to galvanizing in a continuous galvanizing line. During the annealing process in the continuous galvanizing line, the peak temperature was 760° C. to 830° C., the average cooling rate from the peak temperature to 650° C. was 1° C./s to 5° C./s, and the average cooling rate from 650° C. to the plating bath was 3° C./s to 12° C./s. The molten zinc plate was plated in a galvanizing bath having a plating bath temperature of 460° C. and containing 0.13% of Al, and the adhered amount of the plate was adjusted to 50 g/m² using nitrogen gas wiping.

The tensile strength and elongation were measured by cutting a JIS No. 5 test specimen out of the plated steel zone manufactured in the above manner and carrying out a tensile test at room temperature.

The Fe % and the Al % in the plate were measured by ICP after the plate had been dissolved in an inhibitor-containing hydrochloric acid. The Fe % was 10% to 11% on average, and the Al % was 0.2% to 0.3% on average. The adhered amount of the plate was obtained from the difference in the weight before and after the dissolution of the plate. The adhered amount of the plate was 45 g/m² to 55 g/m² on average. In addition, the thickness of the plate was observed from the cross section using an SEM, and the thickness of the plate was 6.3 μm to 7.7 μm on average.

The kind and volume of the microstructure in the inside and surface layer of the steel sheet were observed using an optical microscope having a magnification of 400 times to 1000 times and a SEM having a magnification of 1000 times to 100000 times after a cross section of the steel sheet in a rolling direction or a cross section in the right angle direction of the rolling direction was etched using a Nital reagent and the reagent as disclosed in Japanese Unexamined Patent Application, First Publication No. S59-219473. In addition, the kind and volume of the microstructure in the inside and surface layer of the steel sheet were also observed using a FE-TEM having a magnification of 10000 times to 1000000 times after a cross section sample was manufactured by the FIBμ-sampling method. Twenty or more sites were observed in each of the samples. In addition, the area ratio was specified by the point counting method or an image analysis. The average thickness of the microstructure in which the area ratio of ferrite was 95% or more was also, similarly, observed using an optical microscope having a magnification of 400 times to 1000 times and a SEM having a magnification of 1000 times to 100000 times after a cross section of the steel sheet in a rolling direction or a cross section in the right angle direction of the rolling direction was etched using a Nital reagent and the reagent as disclosed in Japanese Unexamined Patent Application, First Publication No. S59-219473. In addition, the thickness of a thin sample was also observed using a FE-TEM having a magnification of 10000 times to 1000000 times after a cross section sample was manufactured by the FIBμ-sampling method.

The fatigue durability was evaluated using ratios of fatigue limit to tensile strength (fatigue ratios). In the specification, the ratio of fatigue limit to tensile strength is a value of the $2 \times 10^7$ time strength, which is obtained by carrying out a fatigue test according to JIS Z 2275 on No. 1 test specimen as defined in JIS Z 2275 having a parallel portion of 30 mm, a sheet thickness of 2 mm, and a radius curvature of 100 mm, divided by the tensile strength. Steel sheets having a ratio of fatigue limit to tensile strength above 0.7−0.0003×TS were evaluated as passes.

The results are collected in Table 2. The microstructure columns show the area ratios of ferrite (F), bainite (B), martensite (M), residual austenite (γ), and other structures. In addition, the combined area ratio of martensite (M) and residual austenite (γ) is shown. The plated steel sheets Nos. 1, 2, 4, 27, 28, and 29 were less than 770 MPa in TS, which was outside the range of the embodiment. The plated steel sheets Nos. 30, 31, and 32 failed to satisfy the target range in the thickness of the softened layer (surface layer) that was measured by the nano hardness. In these steels, the values of the ratio of fatigue limit to tensile strength were also below the target value. In the products of the embodiment other than the above, favorable fatigue durability can be obtained stably.

In addition, as a result of measuring the concentration of C in the surface layer of each of the plated steel sheets manufactured according to the embodiment, the concentration of C in the steel sheet was maintained in a range of 10% to 30% in all samples.

EXAMPLE 2

Continuous casting was carried out in a continuous casting facility provided with an electromagnetic brake and a wire supplying apparatus for adding an alloy at the molding section, and a slab having the composition as shown in the J row of Table 1 was manufactured. The electromagnetic force of the electromagnetic brake was set to 0.1 T to 1.0 T, and a Fe wire was used. The added amount of the Fe wire was adjusted using the cross-sectional area and supply rate of the Fe wire.

Next, the slab that was manufactured in the above manner and had a variety of thicknesses of concentrated Fe in the surface layer portion was hot-rolled at a heating temperature of 1080° C. to 1150° C., a finishing completion temperature of 910° C. to 930° C., and a winding temperature of 580° C. to 690° C., thereby making a sheet thickness of 4.0 mm. Furthermore, the slab was pickled, then, cold-rolled so as to be 2.0 mm in thickness, and subjected to galvanizing in a continuous galvanizing line. In the continuous galvanizing line, the peak temperature was 800° C., the average cooling rate from the peak temperature to 650° C. was 2° C./s, and the average cooling rate from 650° C. to the plating bath was 5° C./s. The molten zinc plate was plated in a galvanizing bath having a plating bath temperature of 460° C. and containing 0.13% of Al, and the adhered amount of the plate was adjusted to 35 g/m² by nitrogen gas wiping. The alloying temperature of the plate was set to 500° C.

In addition, as a comparative material, an annealing simulator using an infrared image furnace was used, and a thermal treatment that simulated the continuous galvanizing line was carried out in an $N_2$ gas atmosphere. In the annealing simulator, the peak temperature was 800° C., the average cooling rate from the peak temperature to 650° C. was 2° C./s, and the average cooling rate from 650° C. to 460° C. was 5° C./s. The alloying temperature of the plate was set to 500° C.

The tensile strength and elongation were measured by cutting a JIS No. 5 test specimen out of the plated steel zone manufactured in the above manner and carrying out a tensile test at room temperature.

The Fe % and the Al % in the plate were measured by ICP after the plate was dissolved in an inhibitor-containing hydrochloric acid. The Fe % was 10% to 11% on average, and the Al % was 0.2% to 0.3% on average. The adhered amount of the plate was obtained from the difference in the weight before and after the dissolution of the plate. The adhered amount of the plate was 30 g/m² to 40 g/m² on average. In addition, the thickness of the plate was observed from the cross section using a SEM, and the thickness of the plate was 4.2 μm to 5.6 μm on average.

The kind and volume of the microstructure in the inside and surface layer of the steel sheet were observed using an optical microscope having a magnification of 400 times to 1000 times and a SEM having a magnification of 1000 times to 100000 times after a cross section of the steel sheet in a rolling direction or a cross section in the right angle direction of the rolling direction was etched using a Nital reagent and the reagent as disclosed in Japanese Unexamined Patent Application, First Publication No. S59-219473. In addition, the kind and volume of the microstructure in the inside and surface layer of the steel sheet were also observed using a FE-TEM having a magnification of 10000 times to 1000000 times after a cross section sample was manufactured by the FIBμ-sampling method. Twenty or more sites were observed in each of the samples. In addition, the area ratio was obtained by the point counting method or an image analysis.

Similarly, the average thickness of the microstructure in which the area ratio of ferrite is 95% or more was also observed using an optical microscope having a magnification of 400 times to 1000 times and a SEM having a magnification of 1000 times to 100000 times after a cross section of the steel sheet in a rolling direction or a cross section in the right angle direction of the rolling direction was etched using a Nital reagent and the reagent as disclosed in Japanese Unexamined Patent Application, First Publication No. S59-219473. In addition, the thickness of a thin sample was also observed using a FE-TEM having a magnification of 10000 times to 1000000 times after a cross section sample was manufactured by the FIBμ-sampling method.

The fatigue durability was evaluated using ratios of fatigue limit to tensile strength. In the specification, the ratio of fatigue limit to tensile strength is a value of the $2 \times 10^7$ time strength, which is obtained by carrying out a fatigue test according to JIS Z 2275 on No. 1 test specimen as defined in JIS Z 2275 having a parallel portion of 30 mm, a sheet thickness of 2 mm, and a radius curvature of 100 mm, divided by the tensile strength. Steel sheets having a ratio of fatigue limit to tensile strength above 0.7−0.0003×TS were evaluated as passes.

The results are shown in Table 3. Since the average thicknesses of the microstructures in which the area ratio of ferrite was 95% or more were outside the range of the embodiment in Nos. 1 and 12, the ratios of fatigue limit to tensile strength were below 0.7−0.0003×TS. Since the area ratio of ferrite in the surface layer was outside the range of the embodiment in No. 14, the ratio of fatigue limit to tensile strength was below 0.7−0.0003×TS. For No. 15 that was not plated, the ratio of fatigue limit to tensile strength was above 0.7−0.0003×TS even when the average thickness of the microstructure in which the area ratio of ferrite was 95% or more was outside the range of the embodiment; however, conversely, for Nos. 16, 17, and 18 in which the microstructures having an area ratio of ferrite of 95% or more became thick, the ratios of fatigue limit to tensile strength were below 0.7−0.0003×TS.

The products of the embodiment other than the above were high-strength galvannealed steel sheets that can stably produce favorable fatigue durability.

In addition, as a result of measuring the concentration of C in the surface layer of each of the plated steel sheets manufactured according to the embodiment, the concentration of C in the steel sheet was maintained in a range of 10% to 30% in all samples except No. 2.

TABLE 1

| Symbol | Chemical components (mass %) | | | | | | | Chemical components (mass %) | | | | | | | | | |
|---|---|---|---|---|---|---|---|---|---|---|---|---|---|---|---|---|---|
| | C | Si | Mn | P | S | Al | N | Ni | Cu | Cr | Mo | Nb | Ti | V | Ca | REM | B |
| A | 0.073 | 0.54 | 2.18 | 0.011 | 0.0020 | 0.035 | 0.0030 | | | | | | | | | | |
| B | 0.123 | 0.72 | 1.67 | 0.007 | 0.0024 | 0.450 | 0.0029 | | | | | | | | | | |
| C | 0.141 | 1.03 | 2.03 | 0.009 | 0.0022 | 0.027 | 0.0042 | | | | | | | | | | |
| D | 0.081 | 0.12 | 1.55 | 0.009 | 0.0023 | 0.031 | 0.0026 | | | | | | | | | | |
| E | 0.121 | 0.82 | 2.27 | 0.008 | 0.0020 | 0.054 | 0.0034 | | | | | | | | | | |
| F | 0.141 | 1.32 | 1.79 | 0.011 | 0.0021 | 0.031 | 0.0027 | | | | | | | | | | |
| G | 0.176 | 1.24 | 2.50 | 0.009 | 0.0024 | 0.025 | 0.0022 | | | | | | | | | | |
| H | 0.200 | 1.50 | 1.50 | 0.008 | 0.0022 | 0.037 | 0.0028 | | | | | | | | | | |
| I | 0.230 | 1.80 | 1.50 | 0.007 | 0.0023 | 0.032 | 0.0031 | | | | | | | | | | |
| J | 0.100 | 0.69 | 2.32 | 0.009 | 0.0040 | 0.044 | 0.0033 | | | | | | | | | | |
| K | 0.095 | 0.72 | 2.33 | 0.007 | 0.0021 | 0.033 | 0.0022 | 0.80 | | | | | | | | | |
| L | 0.104 | 0.70 | 2.25 | 0.009 | 0.0024 | 0.029 | 0.0025 | | 0.80 | | | | | | | | |
| M | 0.098 | 0.74 | 2.32 | 0.009 | 0.0022 | 0.025 | 0.0023 | | | 0.80 | | | | | | | |
| N | 0.101 | 0.66 | 2.30 | 0.008 | 0.0023 | 0.031 | 0.0021 | | | | 0.60 | | | | | | |
| O | 0.096 | 0.73 | 2.28 | 0.007 | 0.0022 | 0.024 | 0.0024 | | | | | 0.02 | | | | | |
| P | 0.103 | 0.69 | 2.34 | 0.008 | 0.0023 | 0.026 | 0.0022 | | | | | | 0.02 | | | | |
| Q | 0.099 | 0.67 | 2.26 | 0.007 | 0.0021 | 0.033 | 0.0023 | | | | | 0.02 | 0.02 | | | | |
| R | 0.096 | 0.72 | 2.31 | 0.009 | 0.0024 | 0.030 | 0.0025 | | | | | | 0.01 | 0.05 | | | |
| S | 0.102 | 0.68 | 2.35 | 0.009 | 0.0022 | 0.028 | 0.0021 | | | | | | | | 0.003 | | |
| T | 0.099 | 0.65 | 2.27 | 0.009 | 0.0023 | 0.027 | 0.0024 | | | | | | | | | 0.01 | |
| U | 0.101 | 0.71 | 2.34 | 0.009 | 0.0021 | 0.034 | 0.0023 | | | | | | | | | | 0.002 |
| V | 0.098 | 0.66 | 2.26 | 0.008 | 0.0024 | 0.025 | 0.0022 | | | | 0.42 | | 0.02 | | | | |
| W | 0.103 | 0.68 | 2.30 | 0.007 | 0.0021 | 0.032 | 0.0021 | | | 0.50 | | 0.01 | 0.02 | | | | |
| X | 0.097 | 0.70 | 2.29 | 0.009 | 0.0024 | 0.027 | 0.0024 | | | | | 0.02 | 0.01 | | | | |
| Y | 0.105 | 0.69 | 2.32 | 0.009 | 0.0022 | 0.031 | 0.0025 | | | 0.20 | | | 0.03 | | | | |
| Z | 0.100 | 0.74 | 2.28 | 0.008 | 0.0023 | 0.029 | 0.0023 | | | 0.60 | | 0.04 | 0.02 | | | | |
| A2 | 0.020 | 0.73 | 1.87 | 0.006 | 0.0040 | 0.045 | 0.0023 | | | | | | | | | | 0.001 |
| B2 | 0.070 | 0.19 | 1.76 | 0.007 | 0.0030 | 0.034 | 0.0031 | | | | | | | | | | 0.002 |
| C2 | 0.070 | 0.64 | 0.95 | 0.009 | 0.0040 | 0.029 | 0.0040 | | | | | | | | | | 0.002 |
| D2 | 0.143 | 0.76 | 2.08 | 0.009 | 0.0026 | 0.037 | 0.0028 | | | | | | | | | | |
| E2 | 0.105 | 0.76 | 2.15 | 0.008 | 0.0022 | 0.031 | 0.0023 | | | | | 0.02 | 0.03 | | | | |
| F2 | 0.104 | 0.68 | 2.32 | 0.007 | 0.0023 | 0.029 | 0.0024 | | | | 0.45 | | | | | | |

TABLE 2

| Steel sheet No. | Steel sheet symbol | Steel sheet material properties | | | Microstructure in the steel sheet | | | | M + γ (%) | F in the surface layer (%) | Surface Layer C (mass %) | Thickness of the surface layer (μm) | Fatigue ratio | Nano hardness | | | Note |
|---|---|---|---|---|---|---|---|---|---|---|---|---|---|---|---|---|---|
| | | YP (MPa) | TS (MPa) | El (%) | F (%) | B (%) | M (%) | γ (%) | Other (%) | | | | | | Steel sheet inside (GPa) | Surface layer (GPa) | Surface layer/inside | |
| 1 | A | 371 | 607 | 33 | 91 | | | 9 | | 9 | 97 | 0.022 | 0 | 0.57 | 3.02 | 2.74 | 0.91 | Comparative example |
| 2 | B | 395 | 604 | 38 | 89 | 5 | 1 | 5 | | 6 | 97 | 0.035 | 0 | 0.57 | 3.01 | 2.71 | 0.90 | Comparative example |
| 3 | C | 448 | 805 | 28 | 78 | 10 | 2 | 10 | | 12 | 95 | 0.037 | 3.8 | 0.51 | 4.17 | 2.81 | 0.67 | Invention example |
| 4 | D | 389 | 621 | 36 | 90 | 4 | 2 | 4 | | 6 | 98 | 0.020 | 0 | 0.56 | 3.05 | 2.67 | 0.88 | Comparative example |
| 5 | E | 427 | 788 | 27 | 84 | | 15 | 1 | | 16 | 95 | 0.033 | 4.1 | 0.51 | 4.00 | 2.82 | 0.71 | Invention example |
| 6 | F | 462 | 824 | 31 | 78 | 11 | | 11 | | 11 | 93 | 0.041 | 8.6 | 0.5 | 4.39 | 2.87 | 0.65 | Invention example |
| 7 | G | 485 | 872 | 29 | 74 | 12 | 2 | 12 | | 14 | 94 | 0.045 | 5.7 | 0.49 | 5.04 | 2.83 | 0.56 | Invention example |
| 8 | H | 735 | 907 | 33 | 65 | 16 | 3 | 16 | | 19 | 91 | 0.059 | 1.2 | 0.48 | 5.65 | 2.94 | 0.52 | Invention example |
| 9 | I | 764 | 976 | 33 | 61 | 18 | 3 | 18 | | 21 | 91 | 0.062 | 9.4 | 0.46 | 7.16 | 2.93 | 0.41 | Invention example |
| 10 | J | 471 | 777 | 27 | 82 | | | 18 | | 18 | 95 | 0.026 | 0.8 | 0.51 | 3.90 | 2.78 | 0.71 | Invention example |
| 11 | K | 589 | 907 | 23 | 77 | | | 23 | | 23 | 92 | 0.027 | 6.1 | 0.48 | 5.64 | 2.91 | 0.52 | Invention example |
| 12 | L | 581 | 892 | 23 | 78 | | | 22 | | 22 | 91 | 0.031 | 5.9 | 0.48 | 5.37 | 2.94 | 0.55 | Invention example |
| 13 | M | 595 | 916 | 23 | 75 | | | 24 | 1 | 25 | 92 | 0.028 | 2.2 | 0.48 | 5.81 | 2.93 | 0.50 | Invention example |
| 14 | N | 587 | 924 | 24 | 74 | | | 24 | 2 | 26 | 93 | 0.027 | 7.8 | 0.47 | 5.97 | 2.89 | 0.48 | Invention example |
| 15 | O | 534 | 822 | 26 | 82 | | | 18 | | 18 | 95 | 0.024 | 0.5 | 0.49 | 4.36 | 2.79 | 0.64 | Invention example |
| 16 | P | 531 | 817 | 26 | 82 | | | 18 | | 18 | 94 | 0.028 | 4.6 | 0.5 | 4.30 | 2.84 | 0.66 | Invention example |
| 17 | Q | 558 | 858 | 24 | 82 | | | 18 | | 18 | 92 | 0.029 | 1.4 | 0.49 | 4.83 | 2.90 | 0.60 | Invention example |
| 18 | R | 537 | 826 | 25 | 82 | | | 18 | | 18 | 95 | 0.024 | 9.5 | 0.5 | 4.41 | 2.81 | 0.64 | Invention example |
| 19 | S | 472 | 781 | 27 | 82 | | | 18 | | 18 | 94 | 0.030 | 3.7 | 0.55 | 3.93 | 2.85 | 0.73 | Invention example |
| 20 | T | 468 | 778 | 27 | 82 | | | 18 | | 18 | 95 | 0.027 | 8.3 | 0.55 | 3.91 | 2.8 | 0.72 | Invention example |
| 21 | U | 548 | 843 | 25 | 79 | | | 21 | | 21 | 94 | 0.026 | 4.2 | 0.5 | 4.63 | 2.83 | 0.61 | Invention example |
| 22 | V | 570 | 877 | 24 | 79 | | | 21 | | 21 | 93 | 0.027 | 7.6 | 0.49 | 5.12 | 2.89 | 0.56 | Invention example |
| 23 | W | 597 | 918 | 23 | 78 | | | 22 | | 22 | 93 | 0.027 | 6.8 | 0.47 | 5.85 | 2.87 | 0.49 | Invention example |
| 24 | X | 573 | 882 | 24 | 80 | | | 20 | | 20 | 93 | 0.027 | 2.9 | 0.49 | 5.20 | 2.88 | 0.55 | Invention example |
| 25 | Y | 607 | 934 | 22 | 77 | | | 23 | | 23 | 92 | 0.028 | 8.4 | 0.47 | 6.17 | 2.89 | 0.47 | Invention example |
| 26 | Z | 694 | 1069 | 19 | 74 | | | 25 | 1 | 26 | 91 | 0.025 | 3.5 | 0.43 | 10.08 | 2.94 | 0.29 | Invention example |
| 27 | A2 | 296 | 423 | 38 | 100 | | | | | 0 | 99 | 0.007 | 0 | 0.61 | 2.83 | 2.66 | 0.94 | Comparative |

TABLE 2-continued

| | | Steel sheet material properties | | | | Microstructure in the steel sheet | | | | F in the surface layer (%) | Thickness Surface of the surface layer (mass %) | Surface layer (μm) | Fatigue ratio | Nano hardness | | | Note |
|---|---|---|---|---|---|---|---|---|---|---|---|---|---|---|---|---|---|
| No. | Steel sheet symbol | YP (MPa) | TS (MPa) | El (%) | F (%) | B (%) | M (%) | γ (%) | Other (%) | M + γ (%) | | | | Steel sheet inside (GPa) | Surface layer (GPa) | Surface layer/ inside | |
| 28 | B2 | 321 | 459 | 34 | 90 | 1 | | | 9 | 0 | 99 | 0.018 | 0 | 0.59 | 2.85 | 2.66 | 0.93 | Comparative example |
| 29 | C2 | 308 | 431 | 35 | 91 | | | | 9 | 0 | 99 | 0.019 | 0 | 0.62 | 2.84 | 2.65 | 0.93 | Comparative example |
| 30 | D2 | 441 | 816 | 26 | 82 | 1 | 18 | | | 18 | 96 | 0.048 | 0.05 | 0.45 | 4.03 | 2.99 | 0.74 | Comparative example |
| 31 | E2 | 555 | 843 | 25 | 80 | | 19 | 1 | | 20 | 92 | 0.031 | 11.7 | 0.44 | 4.75 | 2.51 | 0.53 | Comparative example |
| 32 | F2 | 578 | 906 | 24 | 75 | | 23 | 2 | | 25 | 93 | 0.025 | 0 | 0.42 | 5.87 | 4.59 | 0.78 | Comparative example |

TABLE 3

| No. | Steel sheet symbol | Steel sheet material properties | | | Microstructure in the steel sheet | | | | F in the surface layer (%) | Thickness of the surface layer (μm) | Surface layer C (mass %) | Plate | Fatigue ratio | Nano hardness | | | Note |
|---|---|---|---|---|---|---|---|---|---|---|---|---|---|---|---|---|---|
| | | YP (MPa) | TS (MPa) | El (%) | F (%) | B (%) | M (%) | γ (%) | M + γ (%) | | | | | Steel sheet inside (GPa) | Surface layer (GPa) | Surface layer/ inside | |
| 1 | J | 471 | 777 | 27 | 82 | | 18 | | 18 | — | 0 | — | Present | 0.42 | 3.90 | — | — | Comparative example |
| 2 | J | 472 | 777 | 27 | 82 | | 18 | | 18 | 96 | 0.05 | 0.490 | Present | 0.48 | 3.89 | 2.78 | 0.71 | Invention example |
| 3 | J | 471 | 778 | 27 | 82 | | 18 | | 18 | 96 | 0.1 | 0.026 | Present | 0.5 | 3.91 | 2.77 | 0.71 | Invention example |
| 4 | J | 470 | 776 | 27 | 82 | | 18 | | 18 | 96 | 0.3 | 0.024 | Present | 0.51 | 3.88 | 2.79 | 0.72 | Invention example |
| 5 | J | 471 | 777 | 27 | 82 | | 18 | | 18 | 95 | 0.5 | 0.025 | Present | 0.51 | 3.90 | 2.78 | 0.71 | Invention example |
| 6 | J | 471 | 776 | 27 | 82 | | 18 | | 18 | 96 | 0.8 | 0.027 | Present | 0.51 | 3.89 | 2.78 | 0.71 | Invention example |
| 7 | J | 470 | 777 | 27 | 82 | | 18 | | 18 | 96 | 1 | 0.026 | Present | 0.52 | 3.87 | 2.79 | 0.72 | Invention example |
| 8 | J | 471 | 778 | 27 | 82 | | 18 | | 18 | 96 | 3 | 0.026 | Present | 0.52 | 3.9 | 2.80 | 0.72 | Invention example |
| 9 | J | 472 | 777 | 27 | 82 | | 18 | | 18 | 95 | 5 | 0.026 | Present | 0.52 | 3.88 | 2.77 | 0.71 | Invention example |
| 10 | J | 471 | 777 | 27 | 82 | | 18 | | 18 | 96 | 8 | 0.026 | Present | 0.52 | 3.86 | 2.78 | 0.72 | Invention example |
| 11 | J | 471 | 777 | 27 | 82 | | 18 | | 18 | 96 | 10 | 0.026 | Present | 0.49 | 3.92 | 2.78 | 0.71 | Invention example |
| 12 | J | 471 | 776 | 27 | 82 | | 18 | | 18 | 96 | 20 | 0.026 | Present | 0.45 | 3.87 | 2.79 | 0.72 | Comparative example |
| 13 | J | 470 | 777 | 27 | 82 | | 18 | | 18 | 90 | 1.5 | 0.026 | Present | 0.5 | 3.89 | 2.76 | 0.71 | Invention example |
| 14 | J | 471 | 777 | 27 | 82 | | 18 | | 18 | 85 | 1.5 | 0.026 | Present | 0.44 | 3.90 | 2.78 | 0.71 | Comparative example |
| 15 | J | 473 | 783 | 27 | 82 | | 18 | | 18 | — | 0 | — | Absent | 0.47 | 3.96 | — | — | Comparative example |
| 16 | J | 472 | 783 | 27 | 82 | | 18 | | 18 | 95 | 0.5 | 0.026 | Absent | 0.46 | 3.95 | 2.77 | 0.70 | Comparative example |
| 17 | J | 473 | 784 | 27 | 82 | | 18 | | 18 | 96 | 1 | 0.026 | Absent | 0.45 | 3.96 | 2.78 | 0.70 | Comparative example |
| 18 | J | 474 | 783 | 27 | 82 | | 18 | | 18 | 95 | 5 | 0.026 | Absent | 0.44 | 3.94 | 2.76 | 0.70 | Comparative example |

Second Embodiment

Hereinafter, a second embodiment of the present invention will be described in detail. Firstly, the reason why the components of the steel sheet used in the embodiment are limited will be described.

The reason why the range of the C amount was set to 0.10% to 0.50% by mass % is that the lower limit of the C amount was set to 0.10% in order to secure the strength, and 0.50% was set as the upper limit, at which the weldability can be maintained.

The reason why the range of the Si amount was set to 0.005% to 2.0% by mass % is that the lower limit of the Si amount was set to 0.005% in order to secure the strength, and the upper limit was set to 2.0%, at which the weldability and plating properties are not adversely affected.

The reason why the range of the Mn amount was set to 0.01% to 3.0% by mass % is that the lower limit was set to 0.01%, at which the effect of increasing the strength is exhibited, and the upper limit was set to 3.0% from the viewpoint of manufacturing costs.

P, S, Al, and N are inevitably contained as elements other than the above. One or more of Ti, Nb, Mo, W, Co, Cu, Cr, Ni, Sn, V, B, and REM may be contained in a range of 0% to 3.5 in total according to necessity.

Next, the reason why the galvanized plated layer used in the embodiment is limited will be described.

The reason why the range of the Al amount in the plated layer is set to 0.01% to 1.5% by mass % is that, when the Al amount is less than 0.01%, Zn oxide-dominant dross is significantly generated on the surface of the plating bath, and the appearance after plating is degraded. Since the effect of suppressing the generation of dross is saturated when the Al amount exceeds 1.5%, the upper limit was set to 1.5% from the viewpoint of manufacturing costs.

The adhered amount of the plate is not particularly limited, but is preferably 1 or more in thickness on a single surface from the viewpoint of corrosion resistance. In addition, the adhered amount on a single surface is preferably 20 μm or less from the viewpoint of the formability, weldability, and economic efficiency.

Meanwhile, it is still within the scope of the embodiment to plate a top layer or carry out a variety of chemical conversion treatments, for example, a phosphate treatment, a weldability-improving treatment, a lubricity-improving treatment, or the like on the plated steel sheet of the embodiment in order to improve the painting properties and weldability.

The range of the sheet thickness t (mm) excluding the plated layer is not particularly limited. The range of the sheet thickness t is ordinarily between 0.4 mm to 3.2 mm, but is preferably between 1.0 mm to 3.2 mm in consideration of the productivity or the load on a rolling machine.

Measurement by the nano-indentation method was carried out by the same method as in the first embodiment. As a result, when the thickness of the softened layer (also expressed as the surface layer) in the ferrite portion of the steel sheet from the plate/ferrite interface was indicated by D (mm), and the thickness of the entire steel sheet excluding the plated layer was indicated by t (mm), a preferred range of D was set to 0.001% to 5% of t. D in the above range produces an effect of improving the hydrogen embrittlement resistance of the steel sheet. The detailed reason thereof is not clear, but it is considered that the presence of the soft layer on the surface layer affects the hydrogen embrittlement resistance. In addition, when the thickness D of the softened layer exceeds 5% of t, the strength of the entire steel sheet is degraded, and therefore 5% was set as the upper limit value.

Meanwhile, in order to sufficiently maintain the strength of the steel sheet even when the softened layer is present, the concentration of C in the softened layer is preferably 10% to less than 30% of the concentration of C in the entire steel sheet. When the concentration of C in the softened layer becomes 10% or less of the concentration of C in the entire steel sheet, the softened layer becomes softer than necessary, and there are cases in which the strength of the steel sheet is adversely affected.

The reason why the range of D is set to $d/4 \leq D \leq 2d$ when the depth from the plate/ferrite interface at which oxides including one or two of Si and Mn, which are present in steel, are present in steel is indicated by d (μm) is that the hydrogen embrittlement resistance is more favorable in the above range. The detailed reason is not clear, but it is considered that the above fact results from the effect of the oxides present in this range for suppressing propagation of cracking.

The size of the oxides including one or two of Si and Mn that are present in the steel is not particularly limited, but the average diameter preferably does not exceed 1 μm so that the elongation is not degraded, and is preferably 5 nm or more in order to suppress promotion of cracking. In addition, the shape of the oxide may be any of a spherical shape, a sheet shape, a needle shape, and the like. The number of the oxides is not particularly limited, but it is preferable that one or more oxides be present in a length of 100 μm in the sheet thickness direction on a cross section at a depth of d (μm) during the observation of the cross section.

The reason why the tensile strength of the steel sheet is set to 770 MPa or more is that, at a tensile strength of less than the 770 MPa, the hardness of the steel material is less than 3.5 GPa, including at the surface, and therefore there is no problem of occurrence and propagation of cracking in the steel material due to hydrogen embrittlement.

The relationship between the thickness D of the soft layer (softened layer) in which the nano hardness generated at this time is 75% or less of that at the inside of the steel sheet and the depth d of the oxide-generated layer is preferably D≥d from the viewpoint of suppressing propagation of cracking.

The method of manufacturing the galvanized steel sheet that is excellent in terms of the hydrogen embrittlement resistance of the embodiment will be described.

A steel sheet containing, by mass %, C: 0.10% to 0.50%, Si: 0.005% to 2.0%, Mn: 0.01% to 3.0% with the remainder composed of Fe and inevitable impurities is threaded to a continuous galvanizing line, and manufactured. When the steel sheet is annealed in the continuous galvanizing line, the peak sheet temperature during the annealing is 650° C. to 900° C. When the peak sheet temperature is set to be in a range of 750° C. to 850° C., there is a tendency for favorable hydrogen embrittlement resistance to be stably obtained, which is preferable.

In addition, when the annealing atmosphere at the peak sheet temperature is controlled to contain, by volume %, 1% to 10% of hydrogen with the remainder composed of nitrogen and inevitable impurities and have a dew point of higher than 0° C. to 50° C., it becomes possible to form a predetermined thickness of a layer in which the nano hardness is 75% or less of that at the inside of the steel sheet on the surface of the steel sheet, and to have the oxide including one or two of Si and Mn present at a predetermined depth in the surface layer portion of the steel sheet, thereby enabling stable obtainment of favorable hydrogen embrittlement resistance. When the hydrogen in the annealing atmosphere is controlled in a range of 2% to 8% by volume %, there is a tendency for favorable hydrogen embrittlement resistance to be more stably obtained, which is preferable. Since generation of Si oxides is suppressed on the surface of the steel sheet after the annealing, the plate wetting properties are also favorable.

The holding time at the peak sheet temperature is dependent on the mechanical properties required for the steel sheet, and thus not particularly limited to a certain range; however, generally, it is preferable to select the holding time necessary to obtain necessary mechanical properties from 10 seconds to 20 minutes. The holding time is preferably between 20 seconds to 150 seconds from the viewpoint of the productivity.

The annealed steel sheet is cooled to a range of 350° C. to 550° C., immersed in a plating bath of 440° C. to 480° C., drawn from the bath, controlled to have a predetermined plate amount, and cooled.

EXAMPLE 3

Next, the example of the embodiment will be described, but the conditions in the example are one example of the conditions employed for confirming the feasibility and effects of the embodiment, and the embodiment is not limited to this example of the conditions. The embodiment can employ a variety of conditions within the gist of the embodiment as long as the object of the embodiment is achieved.

Other elements that are not shown in Table 4 are not added, but included in steel only at a small amount as inevitable impurities.

Steel sheets having the steel components and the sheet thicknesses as shown in Table 4 were subjected to an annealing treatment at the annealing temperatures, hydrogen concentrations, and dew points as shown in Table 5, immersed in a molten Zn plating bath of a bath temperature of 450° C. for 3 seconds, drawn from the bath, controlled to have an adhered amount on a single surface of 1 μm to 20 μm by gas wiping, and, subsequently, subjected to a treatment for cooling to room temperature using nitrogen gas. After the plate on the obtained plated steel sheet was dissolved by an acid, the results of chemical analyses were as shown in Table 5 as Al (%) in the plate.

TABLE 4

| Steel sheet No. | C in steel (%) | Si in steel (%) | Mn in steel (%) | Sheet thickness t (mm) |
|---|---|---|---|---|
| S1 | 0.10 | 0.01 | 0.50 | 1.20 |
| S2 | 0.15 | 0.10 | 0.10 | 1.60 |
| S3 | 0.20 | 0.10 | 0.50 | 1.80 |
| S4 | 0.25 | 0.10 | 1.00 | 2.00 |
| S5 | 0.30 | 0.50 | 2.00 | 2.30 |
| S6 | 0.40 | 0.50 | 3.00 | 2.70 |
| S7 | 0.50 | 0.50 | 0.01 | 3.20 |
| S8 | 0.10 | 1.00 | 0.10 | 1.00 |
| S9 | 0.15 | 1.00 | 0.50 | 1.60 |
| S10 | 0.20 | 1.00 | 1.00 | 1.80 |
| S11 | 0.25 | 2.00 | 2.00 | 2.00 |
| S12 | 0.30 | 2.00 | 3.00 | 2.30 |
| S13 | 0.40 | 2.00 | 0.01 | 2.70 |
| S14 | 0.50 | 0.01 | 0.10 | 3.20 |
| S15 | 0.10 | 0.10 | 0.50 | 1.20 |
| S16 | 0.15 | 0.10 | 1.00 | 1.60 |
| S17 | 0.20 | 0.10 | 2.00 | 1.80 |
| S18 | 0.25 | 0.50 | 3.00 | 2.00 |
| S19 | 0.30 | 0.50 | 0.01 | 2.30 |
| S20 | 0.40 | 0.50 | 0.10 | 2.70 |
| S21 | 0.50 | 1.00 | 0.50 | 3.20 |
| S22 | 0.10 | 1.00 | 1.00 | 1.20 |
| S23 | 0.15 | 1.00 | 2.00 | 1.60 |
| S24 | 0.20 | 2.00 | 3.00 | 1.80 |
| S25 | 0.25 | 2.00 | 0.01 | 2.00 |
| S26 | 0.30 | 2.00 | 0.10 | 2.30 |
| S27 | 0.40 | 0.01 | 0.50 | 2.70 |
| S28 | 0.50 | 0.10 | 1.00 | 3.20 |
| S29 | 0.20 | 1.20 | 1.50 | 1.00 |
| S30 | 0.05 | 0.10 | 0.50 | 1.80 |

TABLE 5

| Plate No. | Steel sheet No. | Hydrogen during annealing (%) | Annealing temp. (° C.) | Dew Point during annealing (° C.) | Plate thickness (μm) | Al in plate (%) | D (μm) | d (μm) | Tensile test value TS (MPa) | Tensile test value El (MPa) | Evaluation of hydrogen embrittlement resistance | C in surface layer (mass %) | Nano hardness Steel sheet inside (GPa) | Nano hardness Surface layer (GPa) | Nano hardness Surface layer/inside | Note |
|---|---|---|---|---|---|---|---|---|---|---|---|---|---|---|---|---|
| M1 | S1 | 3 | 800 | 1 | 2 | 0.39 | 0.16 | 0.09 | 783 | 13 | 3 | 0.028 | 3.95 | 2.86 | 0.73 | Invention example |
| M2 | S2 | 2 | 900 | 5 | 6 | 0.45 | 0.62 | 0.38 | 827 | 15 | 3 | 0.043 | 4.42 | 2.87 | 0.65 | Invention example |
| M3 | S3 | 4 | 850 | 10 | 8 | 0.37 | 1.35 | 0.9 | 856 | 18 | 3 | 0.053 | 4.80 | 2.84 | 0.59 | Invention example |
| M4 | S4 | 6 | 800 | 15 | 10 | 0.41 | 1.5 | 1.2 | 918 | 20 | 3 | 0.063 | 5.85 | 2.85 | 0.49 | Invention example |
| M5 | S5 | 8 | 750 | 20 | 12 | 0.46 | 1.46 | 1.42 | 1064 | 18 | 3 | 0.214 | 9.89 | 3.00 | 0.30 | Invention example |
| M6 | S6 | 10 | 700 | 25 | 6 | 1.18 | 2.8 | 1.8 | 1249 | 17 | 4 | 0.116 | 11.80 | 3.50 | 0.30 | Invention example |
| M7 | S7 | 1 | 650 | 30 | 7 | 0.34 | 5.6 | 3.6 | 1580 | 6 | 4 | 0.128 | 14.10 | 4.18 | 0.30 | Invention example |
| M8 | S8 | 4 | 900 | 40 | 8 | 0.63 | 2.5 | 2.6 | 805 | 15 | 5 | 0.029 | 4.17 | 2.87 | 0.69 | Invention example |
| M9 | S9 | 6 | 850 | 50 | 10 | 0.38 | 16 | 4.2 | 833 | 24 | 4 | 0.041 | 4.50 | 2.84 | 0.63 | Invention example |
| M10 | S10 | 8 | 800 | 1 | 6 | 0.47 | 4.9 | 5.1 | 861 | 27 | 4 | 0.052 | 4.88 | 2.84 | 0.58 | Invention example |
| M11 | S11 | 10 | 750 | 5 | 7 | 0.36 | 1.05 | 1.1 | 932 | 25 | 4 | 0.070 | 6.13 | 2.93 | 0.48 | Invention example |
| M12 | S12 | 2 | 700 | 10 | 8 | 1.14 | 51 | 1.4 | 1027 | 22 | 4 | 0.086 | 8.62 | 3.04 | 0.35 | Invention example |
| M13 | S13 | 4 | 650 | 15 | 9 | 0.49 | 3.5 | 3.7 | 1629 | 6 | 5 | 0.114 | 14.30 | 6.06 | 0.42 | Invention example |
| M14 | S14 | 6 | 900 | 20 | 10 | 0.37 | 3.9 | 4.5 | 1573 | 4 | 5 | 0.133 | 13.90 | 4.50 | 0.32 | Invention example |
| M15 | S15 | 8 | 850 | 25 | 6 | 0.31 | 1.3 | 1.5 | 795 | 13 | 4 | 0.025 | 4.07 | 2.78 | 0.68 | Invention example |
| M16 | S16 | 10 | 800 | 30 | 7 | 0.35 | 2.2 | 1.6 | 816 | 12 | 5 | 0.041 | 4.29 | 2.84 | 0.66 | Invention example |

TABLE 5-continued

| Plate No. | Steel sheet No. | Hydrogen during annealing (%) | Annealing temp. (°C.) | Dew Point during annealing (°C.) | Plate thickness (μm) | Al in plate (%) | D (μm) | d (μm) | Tensile test value TS (MPa) | Tensile test value El (MPa) | Evaluation of hydrogen embrittlement resistance | C in surface layer (mass %) | Nano hardness Steel sheet inside (GPa) | Nano hardness Surface layer (GPa) | Nano hardness Surface layer/inside | Note |
|---|---|---|---|---|---|---|---|---|---|---|---|---|---|---|---|---|
| M17 | S17 | 2 | 750 | 40 | 8 | 0.33 | 2 | 3.2 | 988 | 10 | 5 | 0.058 | 7.47 | 2.99 | 0.40 | Invention example |
| M18 | S18 | 4 | 700 | 50 | 9 | 0.44 | 7.2 | 4.4 | 1204 | 8 | 5 | 0.064 | 11.90 | 3.03 | 0.25 | Invention example |
| M19 | S19 | 6 | 650 | 1 | 10 | 0.38 | 4.2 | 3.8 | 1550 | 5 | 5 | 0.089 | 13.70 | 5.78 | 0.42 | Invention example |
| M20 | S20 | 8 | 900 | 5 | 4 | 0.42 | 3.7 | 2.8 | 1591 | 5 | 4 | 0.108 | 13.80 | 4.85 | 0.35 | Invention example |
| M21 | S21 | 10 | 850 | 10 | 1 | 0.47 | 5.2 | 4.8 | 1642 | 6 | 5 | 0.130 | 14.00 | 4.77 | 0.34 | Invention example |
| M22 | S22 | 2 | 800 | 15 | 20 | 0.36 | 8.3 | 8.1 | 812 | 25 | 5 | 0.028 | 4.25 | 2.85 | 0.67 | Invention example |
| M23 | S23 | 3 | 900 | 20 | 6 | 0.37 | 4.4 | 4.3 | 930 | 22 | 5 | 0.045 | 6.09 | 2.97 | 0.49 | Invention example |
| M24 | S24 | 5 | 850 | 25 | 7 | 0.45 | 8.2 | 6.7 | 979 | 22 | 5 | 0.057 | 7.23 | 2.97 | 0.41 | Invention example |
| M25 | S25 | 7 | 800 | 30 | 8 | 0.34 | 100 | 16 | 1375 | 7 | 5 | 0.066 | 13.40 | 3.53 | 0.26 | Invention example |
| M26 | S26 | 10 | 750 | 40 | 9 | 0.38 | 9.5 | 12 | 1561 | 6 | 4 | 0.075 | 14.20 | 3.93 | 0.28 | Invention example |
| M27 | S27 | 5 | 700 | 50 | 10 | 0.49 | 2.2 | 3.4 | 1597 | 5 | 5 | 0.110 | 13.90 | 5.14 | 0.37 | Invention example |
| M28 | S28 | 10 | 650 | 30 | 6 | 0.35 | 2.3 | 2.3 | 1606 | 6 | 5 | 0.145 | 14.10 | 6.12 | 0.43 | Invention example |
| M29 | S29 | 5 | 750 | −20 | 7 | 0.36 | — | — | 978 | 20 | 1 | — | 7.21 | 2.90 | 0.40 | Comparative example |
| M30 | S24 | 5 | 500 | −2 | 8 | 0.4 | 1 | 0.85 | 1042 | 22 | 1 | 0.059 | 9.11 | 3.03 | 0.33 | Comparative example |
| M31 | S25 | 5 | 600 | 60 | 9 | 0.39 | 20.5 | 8.5 | 1359 | 7 | 1 | 0.068 | 12.70 | 3.56 | 0.28 | Comparative example |
| M32 | S26 | 5 | 800 | −40 | 10 | 0.47 | 0.51 | — | 1594 | 6 | 1 | 0.256 | 13.80 | 4.44 | 0.32 | Comparative example |
| M33 | S26 | 0 | 850 | 2 | 6 | 0.53 | 0.02 | 0.1 | 1585 | 6 | 1 | 0.238 | 13.90 | 5.29 | 0.38 | Comparative example |
| M34 | S25 | 3 | 920 | 65 | 7 | 0.51 | 22.8 | 6 | 1408 | 7 | 1 | 0.064 | 13.10 | 3.46 | 0.26 | Comparative example |
| M35 | S27 | 20 | 800 | −20 | 8 | 0.44 | — | — | 1616 | 5 | 1 | — | 14.30 | 6.60 | 0.46 | Comparative example |
| M36 | S30 | 5 | 800 | −20 | 9 | 0.42 | 0 | 1.3 | 453 | 36 | 5 | 0.016 | 2.84 | 2.65 | 0.93 | Comparative example |
| M37 | S30 | 20 | 800 | −20 | 10 | 0.43 | 0 | — | 447 | 36 | 5 | 0.017 | 2.84 | 2.66 | 0.94 | Comparative example |

In addition, the plated steel sheet was cut in the thickness direction, and the hardness of the steel sheet on a cross section was measured by the nano-indentation method up to a depth of 1/3 of the sheet thickness of the steel sheet from the plate/ferrite interface. How to use the nano-indentation method for measurement is pursuant to the first embodiment.

The depth d (μm) from the plate/ferrite interface at which the oxide including one or two of Si and Mn was present in steel was obtained by observing a cross section of the plated steel sheet using a scanning electron microscope (S-800, manufactured by Hitachi, Ltd.) and confirming a location in which one or more of the oxides identified by an energy dispersion-type X-ray spectrum were present in 100 μm. The results are shown in Table 5.

The hydrogen embrittlement resistance was evaluated as follows: The plated layer was peeled off using a 5% hydrochloric acid solution, cathodic charging was carried out for 24 hours in a $CH_3COOH$—$CH_3COONa$ buffer solution having a pH of 4.5 at a current density of 2 $A/dm^2$ using the steel sheet as the cathode and a galvanostat (HAB-151, manufactured by Hokuto Denko Corporation), subsequently, Cd electroplating was carried out, the steel sheet was cut into a size of 20 mm×100 mm, and a notch having a depth of 50% of the sheet thickness was introduced at the central portion in the longitudinal direction, thereby producing a test specimen. The steel sheet was fractured in a three-point bending test using an Instron testing machine (type number 3380), the fractured surface was observed using a SEM (S-800, manufactured by Hitachi Ltd.), and the area ratio of the brittle fractured surface at the observation site was obtained, thereby evaluating the hydrogen embrittlement resistance. Ratings of 3 or higher represent excellent hydrogen embrittlement resistance.

Rating 1: the area ratio of the brittle fractured surface is more than 50%.

Rating 2: the area ratio of the brittle fractured surface is more than 30% to 50%.

Rating 3: the area ratio of the brittle fractured surface is more than 20% to 30%.

Rating 4: the area ratio of the brittle fractured surface is more than 10% to 20%.

Rating 5: the area ratio of the brittle fractured surface is 10% or less.

It is found from the evaluation results in Table 5 that the plated steel sheet of the embodiment is excellent in terms of the hydrogen embrittlement resistance.

Third Embodiment

Hereinafter, a third embodiment of the present invention will be described in detail. Firstly, the components of the steel sheet used in the embodiment are the same as in the second embodiment, and thus will not be described.

Next, the reason why the plated layer used in the embodiment is limited will be described. The same reason for the limitation as in the second embodiment will not be described, and only the differences will be described.

The reason why the range of the Al amount in the plated layer is set to 0.01% to 1% is that, when the Al amount is less than 0.01%, Zn oxide-dominant dross is significantly generated on the surface of the plating bath, and the appearance after the plating is degraded. When the Al amount exceeds 1%, Fe—Zn alloying on the plated layer becomes significantly suppressed, the line speed of the continuous plating line is reduced, and the productivity is degraded.

The plated layer used in the embodiment is the same as the galvannealed plated layer in the first embodiment.

The reason why the range of the thickness D of the soft layer (softened layer) in which the nano hardness generated at this time is 75% or less of that at the inside of the steel sheet is set to d/4≤D≤2d is that the bending properties are more favorable in this range. The detailed reason is not clear, but it is considered that the above fact results from the effect of the oxides present in this range for suppressing propagation of cracking.

The method of manufacturing the galvanized steel sheet having excellent bending properties of the embodiment will be described. The same portions as in the second embodiment will not be described, and only the difference will be described.

The composition of the steel sheet, the casting conditions, and the processes through annealing are the same as in the second embodiment.

The annealed steel sheet is cooled to a range of 350° C. to 550° C., immersed in a plating bath of 440° C. to 480° C., drawn from the bath, controlled to have a predetermined plate amount, and subjected to a heating treatment for 10 seconds to 60 seconds at a sheet temperature of 400° C. to 600° C., thereby diffusing Fe in the plated layer and forming an alloyed plated layer containing a predetermined concentration of Fe. As the conditions of the alloying, the heating treatment is preferably carried out for 10 seconds to 60 seconds at a sheet temperature of 410° C. to 530° C. from the viewpoint of securing the quality of the steel sheet, and is preferably carried out for 10 seconds to 40 seconds from the viewpoint of suppressing the growth of a Γ phase in the plated layer.

EXAMPLE 4

Next, an example of the embodiment will be described, but the conditions of the example are one example of the conditions employed for confirming the feasibility and effects of the embodiment, and the embodiment is not limited to this example of the conditions. The embodiment can employ a variety of conditions within the gist of the embodiment as long as the object of the embodiment is achieved.

Other elements that are not included in Table 6 are not added, and included only at a small amount as inevitable impurities.

Steel sheets having the steel components and the sheet thicknesses as shown in Table 6 were subjected to an annealing treatment at the annealing temperatures, hydrogen concentrations, and dew points as shown in Table 7, immersed in a molten Zn plating bath of a bath temperature of 450° C. for 3 seconds, drawn from the bath, controlled to have an adhered amount on a single surface to 1 μm to 20 μm by gas wiping, reheated up to a sheet temperature of 400° C. to 600° C. for diffusing Fe in the plated layer, and then cooled up to room temperature using nitrogen gas. After the plate on the obtained plated steel sheet was dissolved by an acid, the results of chemical analyses were as shown in Table 7 as Al (%) in the plate and Fe (%) in the plate.

TABLE 6

| Steel sheet No. | C in steel (%) | Si in steel (%) | Mn in steel (%) | Sheet thickness t (mm) |
|---|---|---|---|---|
| S1 | 0.10 | 0.50 | 0.01 | 1.20 |
| S2 | 0.15 | 0.005 | 0.10 | 1.60 |
| S3 | 0.20 | 0.10 | 0.50 | 1.80 |
| S4 | 0.25 | 0.10 | 1.00 | 2.00 |
| S5 | 0.30 | 0.50 | 2.00 | 2.30 |
| S6 | 0.40 | 0.50 | 3.00 | 2.70 |
| S7 | 0.50 | 0.50 | 0.01 | 3.20 |
| S8 | 0.10 | 1.00 | 0.10 | 1.00 |
| S9 | 0.15 | 1.00 | 0.50 | 1.60 |
| S10 | 0.20 | 1.00 | 1.00 | 1.80 |
| S11 | 0.25 | 2.00 | 2.00 | 2.00 |
| S12 | 0.30 | 2.00 | 3.00 | 2.30 |
| S13 | 0.40 | 2.00 | 0.01 | 2.70 |
| S14 | 0.50 | 0.01 | 0.10 | 3.20 |
| S15 | 0.10 | 0.10 | 0.50 | 1.20 |
| S16 | 0.15 | 0.10 | 1.00 | 1.60 |
| S17 | 0.20 | 0.10 | 2.00 | 1.80 |
| S18 | 0.25 | 0.50 | 3.00 | 2.00 |
| S19 | 0.30 | 0.50 | 0.01 | 2.30 |
| S20 | 0.40 | 0.50 | 0.10 | 2.70 |
| S21 | 0.50 | 1.00 | 0.50 | 3.20 |
| S22 | 0.10 | 1.00 | 1.00 | 1.20 |
| S23 | 0.15 | 1.00 | 2.00 | 1.60 |
| S24 | 0.20 | 2.00 | 3.00 | 1.80 |
| S25 | 0.25 | 2.00 | 0.01 | 2.00 |
| S26 | 0.30 | 2.00 | 0.10 | 2.30 |
| S27 | 0.40 | 0.01 | 0.50 | 2.70 |
| S28 | 0.50 | 0.10 | 1.00 | 3.20 |
| S29 | 0.20 | 1.20 | 1.50 | 1.00 |
| S30 | 0.05 | 0.10 | 0.50 | 1.80 |

TABLE 7

| Plate No. | Steel sheet No. | Hydrogen during annealing (%) | Annealing temp. (° C.) | Dew point during annealing (° C.) | Plate thickness (μm) | Al in plate (%) | Fe in plate (%) | D (μm) | d (μm) | Tensile test value TS (MPa) | Tensile test value El (MPa) | C in surface layer (mass %) |
|---|---|---|---|---|---|---|---|---|---|---|---|---|
| M1 | S1 | 3 | 800 | 1 | 2 | 0.20 | 5 | 0.1 | — | 783 | 13 | 0.028 |
| M2 | S2 | 1 | 900 | 5 | 6 | 0.25 | 7 | 0.2 | — | 827 | 15 | 0.043 |

TABLE 7-continued

| | | | | | | | | | | | | |
|---|---|---|---|---|---|---|---|---|---|---|---|---|
| M3 | S3 | 3 | 850 | 10 | 8 | 0.19 | 12 | 0.4 | 0.2 | 856 | 18 | 0.053 |
| M4 | S4 | 5 | 800 | 15 | 10 | 0.20 | 10 | 0.5 | 0.3 | 918 | 20 | 0.063 |
| M5 | S5 | 7 | 750 | 20 | 12 | 0.25 | 12 | 0.1 | 0.025 | 1064 | 18 | 0.214 |
| M6 | S6 | 10 | 700 | 25 | 6 | 1.00 | 5 | 2.5 | 1.5 | 1249 | 17 | 0.116 |
| M7 | S7 | 1 | 650 | 30 | 7 | 0.01 | 15 | 4.5 | 2.5 | 1580 | 6 | 0.128 |
| M8 | S8 | 3 | 900 | 40 | 8 | 0.50 | 5 | 2.1 | 2.2 | 805 | 15 | 0.030 |
| M9 | S9 | 5 | 850 | 50 | 10 | 0.20 | 10 | 15 | 3.2 | 833 | 24 | 0.041 |
| M10 | S10 | 7 | 800 | 1 | 6 | 0.25 | 11 | 4.2 | 2.4 | 861 | 27 | 0.052 |
| M11 | S11 | 10 | 750 | 5 | 7 | 0.19 | 12 | 0.2 | 0.3 | 932 | 25 | 0.070 |
| M12 | S12 | 1 | 700 | 40 | 8 | 1.00 | 10 | 50 | 0.4 | 1027 | 22 | 0.087 |
| M13 | S13 | 3 | 650 | 15 | 9 | 0.25 | 12 | 2.4 | 2.6 | 1629 | 6 | 0.114 |
| M14 | S14 | 5 | 900 | 20 | 10 | 0.19 | 10 | 3.8 | 4.4 | 1573 | 4 | 0.133 |
| M15 | S15 | 7 | 850 | 25 | 6 | 0.01 | 11 | 0.6 | 0.8 | 795 | 13 | 0.025 |
| M16 | S16 | 10 | 800 | 30 | 7 | 0.05 | 12 | 1.4 | 0.8 | 816 | 12 | 0.041 |
| M17 | S17 | 1 | 750 | 40 | 8 | 0.20 | 10 | 1.2 | 2.4 | 988 | 10 | 0.058 |
| M18 | S18 | 3 | 700 | 50 | 9 | 0.25 | 12 | 6.1 | 3.3 | 1204 | 8 | 0.064 |
| M19 | S19 | 5 | 650 | 1 | 10 | 0.19 | 10 | 3.2 | 2.8 | 1550 | 5 | 0.085 |
| M20 | S20 | 7 | 900 | 5 | 4 | 0.20 | 11 | 3.3 | 2.4 | 1591 | 5 | 0.108 |
| M21 | S21 | 10 | 850 | 10 | 1 | 0.25 | 12 | 5.1 | 4.7 | 1642 | 6 | 0.130 |
| M22 | S22 | 1 | 800 | 15 | 20 | 0.19 | 10 | 6.3 | 6.1 | 812 | 25 | 0.028 |
| M23 | S23 | 3 | 900 | 20 | 6 | 0.20 | 12 | 3.7 | 3.6 | 930 | 22 | 0.043 |
| M24 | S24 | 5 | 850 | 25 | 7 | 0.25 | 5 | 7.8 | 6.3 | 979 | 22 | 0.057 |
| M25 | S25 | 7 | 800 | 30 | 8 | 0.19 | 7 | 100 | 15 | 1375 | 7 | 0.066 |
| M26 | S26 | 10 | 750 | 40 | 9 | 0.20 | 12 | 8.4 | 11 | 1561 | 6 | 0.075 |
| M27 | S27 | 5 | 700 | 50 | 10 | 0.25 | 10 | 1.2 | 2.4 | 1597 | 5 | 0.110 |
| M28 | S28 | 10 | 650 | 30 | 6 | 0.19 | 11 | 1.6 | 1.6 | 1606 | 6 | 0.145 |
| M29 | S29 | 5 | 750 | −20 | 7 | 0.18 | 10 | — | — | 978 | 20 | — |
| M30 | S24 | 5 | 500 | −2 | 8 | 0.20 | 11 | 0.16 | 0.01 | 1042 | 22 | 0.059 |
| M31 | S25 | 5 | 600 | 60 | 9 | 0.20 | 5 | 20 | 8 | 1359 | 7 | 0.068 |
| M32 | S26 | 5 | 800 | −40 | 10 | 0.24 | 5 | 0.01 | — | 1594 | 6 | 0.256 |
| M33 | S26 | 0 | 850 | 2 | 6 | 0.30 | 0.05 | 0.02 | 0.1 | 1585 | 6 | 0.238 |
| M34 | S25 | 3 | 920 | 65 | 7 | 0.30 | 10 | 22 | 5.2 | 1408 | 7 | 0.064 |
| M35 | S27 | 20 | 800 | −20 | 8 | 0.22 | 10 | — | — | 1616 | 5 | — |
| M36 | S30 | 5 | 800 | 15 | 9 | 0.22 | 10 | 0 | 0.3 | 453 | 36 | 0.016 |
| M37 | S30 | 20 | 800 | −20 | 10 | 0.22 | 10 | 0 | — | 447 | 36 | 0.017 |

| Plate No. | Steel sheet No. | Nano hardness | | Surface layer/inside | Bent portion rating | Bent portion cross section rating | Note |
|---|---|---|---|---|---|---|---|
| | | Steel sheet inside (GPa) | Surface layer (GPa) | | | | |
| M1 | S1 | 3.95 | 2.86 | 0.72 | 3 | 3 | Invention example |
| M2 | S2 | 4.42 | 2.87 | 0.65 | 4 | 3 | Invention example |
| M3 | S3 | 4.80 | 2.84 | 0.59 | 3 | 3 | Invention example |
| M4 | S4 | 5.85 | 2.85 | 0.49 | 3 | 4 | Invention example |
| M5 | S5 | 9.89 | 3.00 | 0.30 | 3 | 4 | Invention example |
| M6 | S6 | 11.80 | 3.50 | 0.30 | 4 | 5 | Invention example |
| M7 | S7 | 14.10 | 4.18 | 0.30 | 4 | 5 | Invention example |
| M8 | S8 | 4.17 | 2.87 | 0.69 | 4 | 5 | Invention example |
| M9 | S9 | 4.50 | 2.84 | 0.63 | 5 | 5 | Invention example |
| M10 | S10 | 4.88 | 2.84 | 0.58 | 5 | 5 | Invention example |
| M11 | S11 | 6.13 | 2.93 | 0.48 | 3 | 4 | Invention example |
| M12 | S12 | 8.62 | 3.04 | 0.35 | 3 | 4 | Invention example |
| M13 | S13 | 14.30 | 6.06 | 0.42 | 4 | 5 | Invention example |
| M14 | S14 | 13.90 | 4.50 | 0.32 | 4 | 5 | Invention example |
| M15 | S15 | 4.07 | 2.78 | 0.68 | 3 | 4 | Invention example |
| M16 | S16 | 4.29 | 2.84 | 0.66 | 4 | 5 | Invention example |
| M17 | S17 | 7.47 | 2.99 | 0.40 | 4 | 5 | Invention example |
| M18 | S18 | 11.90 | 3.03 | 0.25 | 5 | 5 | Invention example |
| M19 | S19 | 13.70 | 5.78 | 0.42 | 5 | 5 | Invention example |
| M20 | S20 | 13.80 | 4.85 | 0.35 | 4 | 5 | Invention example |
| M21 | S21 | 14.00 | 4.77 | 0.34 | 4 | 5 | Invention example |
| M22 | S22 | 4.25 | 2.85 | 0.67 | 5 | 5 | Invention example |
| M23 | S23 | 6.09 | 2.97 | 0.49 | 5 | 5 | Invention example |
| M24 | S24 | 7.23 | 2.97 | 0.41 | 5 | 5 | Invention example |
| M25 | S25 | 13.40 | 3.53 | 0.26 | 5 | 5 | Invention example |
| M26 | S26 | 14.20 | 3.93 | 0.28 | 5 | 4 | Invention example |
| M27 | S27 | 13.90 | 5.14 | 0.37 | 5 | 4 | Invention example |
| M28 | S28 | 14.10 | 6.12 | 0.43 | 5 | 4 | Invention example |
| M29 | S29 | 7.21 | 2.90 | 0.40 | 1 | 1 | Comparative example |
| M30 | S24 | 9.11 | 3.03 | 0.33 | 1 | 1 | Comparative example |
| M31 | S25 | 12.70 | 3.56 | 0.28 | 1 | 1 | Invention example |
| M32 | S26 | 13.80 | 4.44 | 0.32 | 1 | 1 | Comparative example |
| M33 | S26 | 13.90 | 5.29 | 0.38 | 1 | 1 | Comparative example |
| M34 | S25 | 13.10 | 3.46 | 0.26 | 1 | 1 | Comparative example |
| M35 | S27 | 14.30 | 6.60 | 0.46 | 1 | 1 | Comparative example |
| M36 | S30 | 2.84 | 2.65 | 0.93 | 5 | 5 | Comparative example |
| M37 | S30 | 2.84 | 2.66 | 0.94 | 5 | 5 | Comparative example |

Meanwhile, the thickness of the steel sheet is slightly reduced by the diffusion of Fe from the steel sheet due to the alloying treatment after the plating, but the reduced amount is a maximum of 5 μm, and there is no substantial influence. Therefore, in the present application, "the sheet thickness of the original sheet before the plating is treated to be the same as the sheet thickness t excluding the thickness of the plate of a product steel sheet."

In addition, the plated steel sheet was cut in the thickness direction, and the hardness of the steel sheet on a cross section was measured by the nano-indentation method up to a depth of ⅓ of the sheet thickness of the steel sheet from the plate/ferrite interface. How to use the nano-indentation method for measurement is pursuant to the first embodiment.

The depth d (μm) from the plate/ferrite interface at which the oxide including one or two of Si and Mn was present in the steel was obtained by observing the cross section of the plated steel sheet using a scanning electron microscope (S-800, manufactured by Hitachi, Ltd.) and confirming a location in which one or more of the oxides that was identified by an energy dispersion-type X-ray spectrogram were present in 100 μm. The results are shown in Table 7.

The bending properties were evaluated as follows: The plated steel sheet was cut into a size of 70 mm☐30 mm so as to produce a sample, and a 30-degree V bending test in which a punch having a V shape that has a width of 30 mm and an angle of 30 degrees was pressed at the center of the 70 mm-long side was carried out. The angle R of the V-shaped punch was set to be constant, 1.0 mm. After the test, the surface at the bent portion was photographed, cracked portions and robust portions were binarized in the observation photo, the area ratios were obtained from all the observation sites on the cracked portions, thereby evaluating the bending properties. The obtained cracked area ratios were given ratings according to the following index, and rates of 3 or higher were set as having reached the pass level.

Furthermore, the bent portion was implanted in a resin, and the cross section of the bent portion was observed using an optical microscope, thereby observing the advancing state of cracking. In the observation of the cross section, among the observation sites, the depth of cracking that had advanced farthest from the surface layer was measured, and the ratio of the crack depth to the sheet thickness of the steel sheet was used as a crack advancing rate. The obtained crack advancing rate was given a rating according to the following index, and ratings of 3 or higher were set as having reached the pass level. The results are shown in Table 7.

Observation of the surface of the bent portion
Rating 1: the area ratio of cracking is more than 20%.
Rating 2: the area ratio of cracking is more than 10% to 20%.
Rating 3: the area ratio of cracking is more than 5% to 10%.
Rating 4: the area ratio of cracking is more than 1% to 5%.
Rating 5: the area ratio of cracking is 1% or less.
Observation of the cross section of the bent portion
Rating 1: the advancing rate of cracking is more than 20%.
Rating 2: the advancing rate of cracking is more than 10% to 20%.
Rating 3: the advancing rate of cracking is more than 5% to 10%.
Rating 4: the advancing rate of cracking is more than 1% to 5%.
Rating 5: the advancing rate of cracking is 1% or less.

It is found from the evaluation results in Table 7 that the plated steel sheet of the present invention is excellent in terms of the bending properties.

INDUSTRIAL APPLICABILITY

According to the present invention, it is possible to provide a plated steel sheet that is excellent in terms of the hydrogen embrittlement resistance. In addition, according to the present invention, it becomes possible to manufacture a high-strength galvannealed steel sheet that is excellent in terms of the hydrogen embrittlement resistance without degrading the productivity. Particularly, the present invention is expected to be used as a reinforcing member for automobiles, and has a large industrial meaning.

As described above, according to the present invention, it is possible to provide a plated steel sheet that is excellent in terms of the bending properties. Particularly, the present invention is expected to be used as a reinforcing member for automobiles, and has a large industrial significance.

The invention claimed is:

1. A galvanized steel sheet having a tensile strength of 770 MPa or more, comprising;
   a steel sheet portion containing, by mass %,
   C: 0.05% to 0.50%,
   Si: 0.005% to 2.5%,
   Mn: 0.01% to 3.0%,
   Al: 0% to 0.5%,
   Ni: 0% to 2.0%,
   Cu: 0% to 7.0%,
   Cr: 0% to 2.0%,
   Mo: 0% to 2.0%,
   B: 0% to 0.002%,
   Ti: 0% to 0.1%,
   Nb: 0% to 0.1%,
   V: 0% to 0.1%,
   REM: 0% to 0.1%,
   Ca: 0% to 0.1%,
   P: limited to 0.03% or less,
   S: limited to 0.02% or less,
   N: limited to 0.0060% or less, and
   a remainder of Fe and inevitable impurities; and
   a plated layer formed on a surface of the steel sheet portion, wherein:
   the plated layer is a galvanized plated layer or a galvannealed plated layer, the galvanized plated layer containing Al: 0.01% to 1.5% and one or more selected from Pb, Sb, Si, Sn, Mg, Mn, Ni, Cr, Co, Ca, Cu, Li, Ti, Be, Bi, and REM in a total of 0% to 3.5% with a remainder composed of Zn and inevitable impurities, and the galvannealed plated layer containing Fe: 5% to 15% Al: 0.01% to 1% and one or more selected from Pb, Sb, Si, Sn, Mg, Mn, Ni, Cr, Co, Ca, Cu, Li, Ti, Be, Bi, and REM in total of 0% to 3.5% with a remainder of Zn and inevitable impurities,
   the steel sheet portion has a soft layer in a direction of the steel sheet surface that directly adjoins an interface with the plated layer on one side and directly adjoins an inside layer that is other than the soft layer on an opposite side,
   the soft layer is closer to the interface with the plated layer in a thickness direction than the inside layer,
   a thickness D of the soft layer is 0.001% to 5% of a thickness t of the steel sheet portion, and,
   when a hardness of the soft layer measured by a nano-indentation method is indicated by H1, and a representative hardness of the steel sheet portion measured by the nano-indentation method is indicated by Ha in a cross section that goes along the thickness direction of the steel sheet portion, H1 is 5% to 75% of Ha.

2. The galvanized steel sheet according to claim 1, wherein, when an oxide including one or two of Si and Mn is present in a steel sheet surface layer portion having a depth d or less from a plate/steel surface layer interface, the depth d in which the oxide is present and D satisfy $d/4 \leq D \leq 2d$.

3. The galvanized steel sheet according to claim 1, wherein the steel sheet portion further contains more than 0.10% and 0.50% or less of C.

4. The galvanized steel sheet according to claim 1, wherein the C concentration in the soft layer is 10% to less than 30% of the C concentration of the entire steel sheet portion.

5. A method of manufacturing the galvanized steel sheet according to claim 1, wherein conditions for annealing ahead of plating in a continuous galvanizing line for the steel sheet portion are:

a peak sheet temperature is controlled to 650° C. to 900° C.;

an annealing atmosphere at the peak sheet temperature is controlled to contain, by volume %, 1% to 10% of hydrogen and a remainder composed of nitrogen and inevitable impurities; and, furthermore, a dew point is controlled to higher than 0° C. and 50° C. or lower.

6. A method of manufacturing the galvanized steel sheet according to claim 1 comprising:

a process in which a direct current magnetic field that traverses the thickness of a slab is applied so as to form a direct current electric field one during continuous casting, and an upper pool that forms an upper area of the slab after the casting and a lower pool that forms a lower area are partitioned, and a process in which a steel material composed of Fe or an alloy mainly containing Fe is supplied to the upper pool.

* * * * *